US 7,650,303 B2

(12) United States Patent
Loeper

(10) Patent No.: US 7,650,303 B2
(45) Date of Patent: *Jan. 19, 2010

(54) METHOD AND SYSTEM FOR FINANCIAL ADVISING

(75) Inventor: David B. Loeper, Midlothian, VA (US)

(73) Assignee: Financeware, Inc., Richmond, VA (US)

( * ) Notice: Subject to any disclaimer, the term of this patent is extended or adjusted under 35 U.S.C. 154(b) by 178 days.

This patent is subject to a terminal disclaimer.

(21) Appl. No.: 11/423,165

(22) Filed: Jun. 9, 2006

(65) Prior Publication Data

US 2006/0218068 A1    Sep. 28, 2006

Related U.S. Application Data

(63) Continuation-in-part of application No. 11/014,378, filed on Dec. 15, 2004.

(60) Provisional application No. 60/530,144, filed on Dec. 17, 2003.

(51) Int. Cl.
*G06Q 40/00* (2006.01)

(52) U.S. Cl. .......................... 705/36 R; 705/35; 705/37

(58) Field of Classification Search .............. 705/35–37
See application file for complete search history.

(56) References Cited

U.S. PATENT DOCUMENTS 4,953,085 A    8/1990    Atkins (Continued)

FOREIGN PATENT DOCUMENTS

EP        1283488 A1    7/2001

(Continued)

OTHER PUBLICATIONS

USPTO Office Action; U.S. Appl. No. 11/014,378; mailing date May 23, 2007.
USPTO Office Action; U.S. Appl. No. 11/014,378; mailing date Oct. 9, 2007.

(Continued)

*Primary Examiner*—Jagdish N Patel
*Assistant Examiner*—Sara Chandler
(74) *Attorney, Agent, or Firm*—Thomas, Raring & Teague, P.C.

(57) ABSTRACT

A method of providing financial advice to a client that provides sufficient confidence that their goals will be achieved or exceeded but that avoids excessive sacrifice to the client's current or future lifestyle and avoids investment risk that is not needed to provide sufficient confidence of the goals a client personally values. The method comprises obtaining typical client background information, as well as a list of investment goals, and ideal and acceptable values in dollar amounts and timing for each goal. The client is then asked to provide their preferences for each goal on the list compared to each other goal in the list, wherein the client's preference is expressed in terms of the price, in money or time, that the client is willing to pay in one goal to achieve another goal or a greater amount or sooner timing of other goals on the list. A matrix can be used to express these value contrasts. A recommendation is then created using the portfolio value, and the client goal preferences and the ideal and acceptable values of goals, by simulating models of the relevant capital markets and investing exclusively in passive investment alternatives to avoid the risk of potential material underperformance of active investments under the premise of avoiding investment risk that is not needed to confidently buy the client the goals they personally value. The recommendation may include a range of portfolio values over their life or time horizon within which the client's portfolio should remain in order to ensure the recommendation remains within a "comfort zone", which represents sufficient confidence that the client's goals will be achieved while avoiding excessive current sacrifice. Periodic monitoring of the recommendation is also performed to capture changes to the client's goals and actual portfolio values based on the results of the capital markets. Appropriate changes to the recommendation can then be made to ensure that the recommendation remains within the "comfort zone".

63 Claims, 7 Drawing Sheets

U.S. PATENT DOCUMENTS

| | | | |
|---|---|---|---|
| 5,193,056 A | | 3/1993 | Boes |
| 5,245,535 A | | 9/1993 | Weiss et al. |
| 5,291,398 A | * | 3/1994 | Hagan .................. 705/4 |
| 5,615,109 A | | 3/1997 | Eder |
| 5,644,727 A | | 7/1997 | Atkins |
| 5,774,881 A | | 6/1998 | Friend |
| 5,802,501 A | | 9/1998 | Graff |
| 5,812,988 A | | 9/1998 | Sandretto |
| 5,819,263 A | | 10/1998 | Bromley et al. |
| 5,852,811 A | | 12/1998 | Atkins |
| 5,864,828 A | | 1/1999 | Atkins |
| 5,875,435 A | | 2/1999 | Brown |
| 5,875,437 A | | 2/1999 | Atkins |
| 5,878,405 A | | 3/1999 | Grant et al. |
| 5,884,283 A | | 3/1999 | Manos |
| 5,884,285 A | | 3/1999 | Atkins |
| 5,884,287 A | | 3/1999 | Edesess |
| 5,903,879 A | | 5/1999 | Mitchell |
| 5,911,135 A | | 6/1999 | Atkins |
| 5,911,136 A | | 6/1999 | Atkins |
| 5,918,217 A | | 6/1999 | Maggioncalda et al. |
| 5,933,815 A | | 8/1999 | Golden |
| 5,946,667 A | | 8/1999 | Tull, Jr. et al. |
| 5,987,433 A | | 11/1999 | Crapo |
| 5,999,918 A | | 12/1999 | Williams et al. |
| 6,003,018 A | * | 12/1999 | Michaud et al. ........... 705/36 R |
| 6,012,043 A | | 1/2000 | Albright et al. |
| 6,012,044 A | | 1/2000 | Maggioncalda et al. |
| 6,021,394 A | | 2/2000 | Takahashi |
| 6,021,397 A | * | 2/2000 | Jones et al. ............... 705/36 R |
| 6,026,381 A | | 2/2000 | Barton, III et al. |
| 6,055,517 A | * | 4/2000 | Friend et al. .............. 705/36 R |
| 6,058,376 A | | 5/2000 | Crockett |
| 6,064,984 A | * | 5/2000 | Ferguson et al. .......... 705/36 R |
| 6,078,904 A | | 6/2000 | Rebane |
| 6,085,175 A | * | 7/2000 | Gugel et al. .............. 705/36 R |
| 6,154,732 A | | 11/2000 | Tarbox |
| 6,173,276 B1 | * | 1/2001 | Kant et al. ..................... 706/50 |
| 6,253,192 B1 | | 6/2001 | Corlett et al. |
| 6,275,814 B1 | * | 8/2001 | Giansante et al. ......... 705/36 R |
| 6,278,981 B1 | * | 8/2001 | Dembo et al. ............. 705/36 R |
| 6,298,334 B1 | | 10/2001 | Burfield et al. |
| 6,340,542 B1 | | 1/2002 | Inoue et al. |
| 6,430,542 B1 | | 8/2002 | Moran |
| 6,456,982 B1 | | 9/2002 | Pilipovic |
| 6,564,191 B1 | | 5/2003 | Reddy |
| 6,772,136 B2 | * | 8/2004 | Kant et al. ..................... 706/50 |
| 6,850,923 B1 | | 2/2005 | Nakisa et al. |
| 6,985,880 B1 | * | 1/2006 | Hodgdon et al. ........... 705/36 T |
| 7,016,870 B1 | * | 3/2006 | Jones et al. ..................... 705/35 |
| 7,188,076 B2 | * | 3/2007 | Bensemana .................... 705/10 |
| 7,577,597 B1 | * | 8/2009 | Allison et al. ................. 705/35 |
| 2001/0014873 A1 | | 8/2001 | Henderson et al. |
| 2001/0044739 A1 | * | 11/2001 | Bensemana .................... 705/10 |
| 2002/0019791 A1 | * | 2/2002 | Goss et al. ..................... 705/36 |
| 2002/0073005 A1 | | 6/2002 | Welnicki et al. |
| 2002/0091604 A1 | | 7/2002 | Loeper |
| 2002/0091607 A1 | * | 7/2002 | Sloan et al. .................... 705/36 |
| 2002/0111890 A1 | * | 8/2002 | Sloan et al. .................... 705/36 |
| 2002/0138386 A1 | * | 9/2002 | Maggioncalda et al. ....... 705/36 |
| 2002/0143680 A1 | | 10/2002 | Walters et al. |
| 2002/0147671 A1 | | 10/2002 | Sloan et al. |
| 2003/0028464 A1 | | 2/2003 | Kosinski |
| 2003/0088489 A1 | | 5/2003 | Peters et al. |
| 2003/0088492 A1 | * | 5/2003 | Damschroder ............... 705/36 |
| 2003/0097324 A1 | | 5/2003 | Speckman |
| 2003/0126054 A1 | * | 7/2003 | Purcell, Jr. ................... 705/36 |
| 2003/0144936 A1 | | 7/2003 | Sloan et al. |
| 2003/0208427 A1 | | 11/2003 | Peters et al. |
| 2003/0212622 A1 | | 11/2003 | Wallman |
| 2003/0233304 A1 | * | 12/2003 | Dhurandhar et al. .......... 705/36 |
| 2004/0103052 A1 | * | 5/2004 | Eapen .......................... 705/36 |
| 2004/0133497 A1 | | 7/2004 | Spear |
| 2004/0172357 A1 | | 9/2004 | Padgette |
| 2004/0267651 A1 | * | 12/2004 | Jenson et al. ................. 705/36 |
| 2005/0010510 A1 | * | 1/2005 | Brose et al. ................... 705/35 |
| 2005/0154662 A1 | | 7/2005 | Langenwalter |
| 2006/0010053 A1 | | 1/2006 | Farrow |
| 2006/0074788 A1 | * | 4/2006 | Grizack et al. ................ 705/35 |

FOREIGN PATENT DOCUMENTS

| | | |
|---|---|---|
| WO | WO 96/18162 | 6/1996 |
| WO | WO 9844444 A1 * | 10/1998 |
| WO | WO 9928845 A1 * | 6/1999 |

OTHER PUBLICATIONS

USPTO Office Action; U.S. Appl. No. 11/014,378; mailing date Jun. 17, 2008.

USPTO Office Action; U.S. Appl. No. 09/916,358; mailing date Mar. 2, 2006.

USPTO Office Action; U.S. Appl. No. 09/916,358; mailing date Aug. 16, 2006.

USPTO Office Action; U.S. Appl. No. 09/916,358; mailing date Jun. 29, 2007.

USPTO Office Action; U.S. Appl. No. 09/916,358; mailing date Jul. 9, 2008.

USPTO Office Action; U.S. Appl. No. 11/014,378; mailing date Apr. 6, 2009.

Larry Bierwirth, "Investing in retirement: Using the Past to Model the Future", Journal of Financial Planning, v7nI, Jan. 1994, 6 pages.

Hendricks, D., Evaluation of Value-at-Risk Models Using Historical Data, FRBNY Economic Policy Review, Apr. 1996, pp. 39-70.

Bangen, W., Determining Withdrawl Rates Using Historical Data, Oct. 1994, pp. 171-180.

Planners Must Tailor Mutual Fund Mix to Suit Client:, Financial Services Week, Aug. 1990, pp. 23, ISSN: 0895-8440.

Ellen Jovin, "New Software, New Sophistication", Financial Planning, pp. 1-6, 1998.

The Vanguard Group of Investment Companies, "Retirement Planner" Version 3.0 for Windows, Retirement Planning Software, 1995.

Kenneth et al., "Helping Employees Invest Wisely", HR Magazine v38n 11, pp. 77-82, Nov. 1993, Dialog File 15, Accession No. 00794493.

D. Haddock, H. Brock, College Accounting, Seventh Edition, Glencoe Division Mcmillan/Mcgraw-Hill, 1994, pp. 100, 161, 145-153, 453, 640-669, 736-741, 757-761, 1092-1095.

Japanese Office Action; Application No. 2006-545366; Date of Transmittal May 19, 2009.

"Basic Analysis Tools Cover the Gamut of PFP Practices", Steven Levey; Accounting Today, vol. 17, No. 5 Feb. 17, 2003 pp. 18-19, 47-48.

WO 00/26843, English Counterpart of Japan Application No. 2002-529824.

English Translation of Japanese Patent Application No. 2002-073968; publication date Mar. 12, 2002.

English Translation of Japanese Patent Application No. 2002-140527; publication date May 17, 2002.

India Search Report; Application No. 1853/DELNP/2006; 2 pages.

USPTO Office Action; U.S. Appl. No. 09/916,358; mailing date Jan. 22, 2009.

USPTO Office Action; U.S. Appl. No. 11/014,378; mailing date Nov. 25, 2008.

* cited by examiner

| Understanding your priorities is very important to the advice process. Please take a moment to review your acceptable compromises. | | | | | | |
|---|---|---|---|---|---|---|
| | | Acceptable Compromises | | | | |
| | | Take More Investment Risk | Save More | Retire Later | Reduce Size of Estate | Reduce Retirement Spending |
| G O A L S | To reduce the investment risk in our portfolio, we would be willing to: | N/A | | X | X | |
| | We would like to reduce our current savings and to achieve this we would prefer to: | | N/A | X | X | |
| | To achieve our early retirement age, we would be willing to: | | | N/A | X | |
| | In order to achieve our larger estate goal, we would be willing to: | | | X | N/A | |
| | To achieve our higher spending target in retirement, we would prefer to: | X | | X | X | N/A |

*Fig. 3*

METHOD AND SYSTEM FOR FINANCIAL ADVISING

This application is a continuation-in-part application of copending-U.S. patent application Ser. No. 11/014,378, filed Dec. 15, 2004, by David B. Loeper, titled "Method and System for Financial Advising", which is a non-provisional application of U.S. provisional application Ser. No. 60/530,144, filed Dec. 17, 2003, by David B Loeper, titled "Method and System for Providing Investors Financial Planning Advice, Giving Consideration to Individual Values, Without Unnecessary Sacrifice or Undue Investment Risk with Accurate Confidence Levels," and is related to co-pending U.S. patent application Ser. No. 09/916,358, filed Jul. 27, 2001, by David B. Loeper, titled "Method, System and Computer Program for Auditing Financial Plans," which is a non-provisional of U.S. provisional application Ser. No. 60/221,010, filed Jul. 27, 2000, by David B. Loeper, titled "Method, System and Computer Program for Auditing Financial Plans"; and is related to U.S. patent application Ser. No. 09/434,645, filed Nov. 5, 1999, by David B. Loeper, titled "Method, System, and Computer Program for Auditing Financial Plans," which is a non-provisional application of U.S., Provisional application Ser. No. 60/107,245, filed Nov. 5, 1998, the entirety of each of which applications are incorporated herein by reference.

FIELD OF THE INVENTION

This invention relates to the field of financial services, and in particular to a new method of financial advising.

BACKGROUND OF THE INVENTION

The field of financial advising includes various best practices. These best practices include identifying a client's financial goals (e.g. desired retirement age, desired annual income at retirement, desired vacation budget in retirement, desired estate value at death. etc.). In some application of general industry practices, but not all, clients are also asked to rank the stated goals in relative order of importance. Generally accepted "Best practices" also include identifying the client's risk tolerance and creating an investment allocation aimed at producing the highest return for the client's risk tolerance and then based on that allocation's expected return, calculating the savings needed to achieve the client's goals. In a conventional approach, to determine the client's risk tolerance a financial advisor uses a risk tolerance questionnaire or asks the client about their tolerance for investment risk defined by various mathematical methods like standard deviation, semivariance or more commonly the largest level of annual portfolio losses with which the client could tolerate. This risk tolerance inquiry may be more nuanced, such as attempting to determine the amount of assets or percentage of value of a retirement plan that the client is willing to put into assets of various risks. Whatever method of attempting to identify the client's risk tolerance is used, the result of this inquiry is then used in recommending an allocation and related investments to an individual Often, investors are advised to accept a risk tolerance that is at or near the client's maximum endurance level for losses and or risk in their portfolio value.

Often the allocations are tested using a Monte Carlo simulation based on assumptions of the capital markets, samples of historical data, or both. The results of these simulations normally are used to convey a confidence level and/or a percentage risk of failure to achieve a desired income level, assets at retirement or any other of the client's identified goals.

In other approaches, such as wealth management, the client may define their risk tolerance and goals, and the advisor may provide advice regarding asset allocation relative to those risks and goals. Often, the financial advisor has the capability of running Monte Carlo simulations of future returns of various financial plans. These simulations can provide results which include a confidence level and therefore either an implicit or explicit percentage risk of failure to achieve a desired income level, assets at retirement, ending estate value, or other goals As before, the client may be advised to allocate their assets in the asset classes modeled and to invest in a variety of managed or unmanaged portfolio choices. Advisors may advise the client that actively managed investment alternatives can exceed the performance of the asset classes themselves (i.e. that they can outperform the market). Often, the fact that such actively managed investment alternatives also carry the risk of materially underperforming the market may not be adequately conveyed to the client by the advisor, or such risk may simply not be adequately understood by the investor, or the advisor and that uncertainty is not normally considered in the confidence calculation which normally relies on the simulated performance of only asset classes to consider the effect of the uncertainty of asset class returns. Therefore the additional uncertainty that active management risks potentially underperforming the various asset classes is normally not considered It is ignored and therefore renders the confidence level of such simulations in essence meaningless Typical disclaimers used in the industry, which are in significant part intended to provide legal safe harbor to the advisor (e.g. "past performance is not a guarantee of future results"), may not adequately convey to the client the nature of the risk in actively managed investments This is because normally the confidence calculation was based on the uncertainty of asset class returns; but actively managed portfolios may equal, exceed or under-perform their respective asset classes thereby introducing additional uncertainty absent from the confidence calculation. Therefore, what that confidence number means may or may not be fully understood by the client, or the financial advisor for that matter Furthermore, current approaches often involve periodic reviews of the performance of the client's portfolio. As part of the review the client may be provided with a chart, graph or other representation of how their portfolio has performed relative to the various capital markets (i.e. the client's optimal allocation to various asset classes for their risk tolerance). If performance was lower than expected or assumed by the advisor in the original consultation, the client may be advised to change investment managers, wait for a more favorable environment for the manager's "style" or perhaps increase the amount contributed to the portfolio. Alternatively, the client may be advised to eliminate one or more of the lowest-ranked goals. If, on the other hand, performance was better than expected, the client will typically not be advised to reduce the amount contributed to the portfolio, even if such a reduction based on the superior performance is possible (i.e., maintaining the original "risk tolerance" level).

Thus, there is a need in the industry for a new method of financial advising that eliminates the substantial uncertainties associated with investing the client's assets in actively managed investment alternatives, does not position clients at their maximum tolerance for risk if there are more appealing choices the client could make that enable them to have sufficient confidence of achieving the goals they value and thus eliminates the aforementioned difficulties associated with conveying such risks to the client. Furthermore, there is a need to provide clients with periodic feedback that does not simply chart how their portfolio has performed relative to the market, but rather provides clients with a practical understanding of the concrete impact that the performance of their portfolio has had their desired goals. There is also a need for a more nuanced approach to evaluating client goals, which comprises more than a simple linear ranking of goals, but rather which interrelates all of the client's goals so that the client can make more informed and satisfying choices about their goals in light of the performance of their portfolio. As a result, the inventive system will be more highly valued by clients compared to current approaches.

SUMMARY OF THE INVENTION

The method of the invention is directed to applying a new method of financial advising that is more appropriate and more highly valued by individuals because it is more reliable, because it avoids the risk of materially underperforming markets, because it accurately exposes not only risk over the long-term confidence of exceeding a set of financial goals, but importantly also accurately discloses and demonstrates the short-term risks of change to the plan that are out of both the client's and financial advisors' control, and because it continually is modified based upon both fortunate and unfortunate portfolio results, changing goals and priorities as well as the best choices the client can make based on their personal goals to maintain adequate confidence. The advising discipline includes a new method of identifying and assessing not only the client's goals, as in traditional services, but also identifying and assessing the price that the client is willing to pay in one goal to "buy" another goal (or portion of a goal) that is valued more highly. The method also includes a means of modeling the uncertainty in future markets so that represented confidence levels can be easily and fully understood by the client.

The method includes a means of using probability analysis to define the balance between too much uncertainty and too much sacrifice. Thus, the method combines mathematical market simulation with the profiling of the client's goals, and the balance between too much and too little risk, to produce both a recommended package of goals and an investment strategy that balance the desire to have sufficient confidence, avoid unnecessary risk, yet make the most of the client's lifestyle arid do so in a manner that is easily understood by the individual investor. Thus, Monte Carlo simulation and/or historical market analysis can be used to model market uncertainty in a manner that provides the client with a balance of sufficient confidence yet that also avoids undue sacrifice to their goals.

Further, the method includes investing exclusively in passive investments, for which it is possible to mathematically prove in all material respects the risk of underperforming or outperforming the targeted asset allocation. This is unlike actively managed investments, which carry the risk of material uncertainty of underperforming or potentially outperforming the asset allocation strategy, The method further comprises a periodic review and reanalysis of the client's goals and the effect of the market's impact on one's goals as well as new advice that continuously improves, maintains or corrects the choices the client is making in their life goals and portfolio based on both the market's impact as well as changing goals and priorities. Quarterly reprioritization of goals can be performed, to eliminate outdated goals or goals that have become unimportant for any reason, and to add new goals. The periodic review and reanalysis also includes reviewing value of the client's portfolio to ensure that it remains within the "comfort zone," i.e. the balance between insufficient confidence and too much sacrifice to one's lifestyle.

By properly assessing the client's goals and their relative weighting, both unacceptable sacrifice and insufficient confidence can be avoided. The proper relative weighting of goals, in accordance with the clients subjective assessment and the advisor's interpretation of that assessment, is important in providing advice that minimizes any sacrifice as perceived by the client. A recommendation should include a target value for each goal not worse than the acceptable value and not better than the ideal value. A recommendation under this method of financial advice will have rational, sufficient confidence yet avoid excessive sacrifice to one's goals. Clients are preferably provided with a range of future portfolio values that would provide an acceptable range of confidence as demonstrated in FIG. 5. Recommendations are reviewed periodically for changes in client's goals, changes in priorities among clients goals, and whether the risk of unacceptable outcomes has become too high (i.e. too much uncertainty which requires new advice about the choices the client has to bring the confidence level back into the "comfort zone", or whether the performance of the portfolio has brought them to the point of having choices to increase goals or reduce risk). Because of the wide range of uncertainty in capital markets and changes to a client's future goals (in most reasonable probability simulation methods, a client may have an equal chance [i.e. 1 in 1000] at being broke in just a few years or dying with a multi-million dollar estate based only upon the uncertainty of asset class returns, exclusive of the uncertainty of active investment results relative to the markets and excluding the likelihood of future changes to client's goals) and therefore the notion of being able to have certainty to avoid an unsatisfactory result is erroneous. Also, attempting to provide the highest confidence level possible, can only come at the price of compromising client's goals and/or accepting more investment risk which contradicts the notion of avoiding unnecessary sacrifice to the client's lifestyle. In essence, in the absence of a reasoned acceptable range of confidence (i.e. attempting to get to the highest confidence level possible) no amount of conservatism (sacrifice) is too much. Therefore, this method embraces and manages the uncertainties of the future to provide continuous advice about the best choices a client can make about their lifestyle as well as the optimal acceptance and avoidance of investment risk in light of the uncertainties of the future, (not only in the markets, and not only by avoiding the added uncertainty of active investments, but also the uncertainty of the client's desire and willingness to change their goals or priorities throughout their lives as may be desired, or as may be necessary to obtain reasoned confidence, based on how the capital markets performed.) This method accomplishes this balance of the best choices based on what is currently known, what is currently planned to be desired, and reasonable confidence considering the effect of the uncertainty of future asset class returns on the client's lifestyle and their willingness to modify their goals. While traditional best practices attempt to be "right" about where a client may end up falling in the wide range of market uncertainties (assuming they do not change their goals and their active portfolio implementation doesn't under-perform the asset classes, obviously erroneous assumptions that render such advice meaningless) the reality of the wide potential extremes of outcomes sets up financial advisors and their client's for a continuous stream of surprises without a means of taking a determined course of action based on random market events. When short-term market environments produce disappointing results in traditional advising methods, the typical first course of action, is inaction (i.e. wait because we hope in the long term things work out). If short term market environments or fortunate active management selection produce unexpectedly positive results, traditional best practices normal action is again inaction, merely celebrating the random or skillful fortunate outcome. By contrast, the present method of financial advising defines specific values in advance (see FIG. 5) where new advice would be required (if the clients goals and priorities remain unchanged) allowing client's to prepare for and know what prudent modifications in terms of reducing or delaying goals (or accepting more investment risk) make sense based on what has happened in extremely poor environments and where client's have the choice to increase a goal or have the goal sooner, or reduce investment risk where results are exceptional, in either case requiting determined action of new advice needing to be designed. Critical to this process is the creation of a confidence range that considers the uncertainties of the markets, and that the "action point" or portfolio(s) value(s) (see FIG. 5) for needing compromising advice is relatively infrequent (i.e. the client would have little confidence in an advisor if half the time their advice is to reduce goals or delay goals and half the time increasing goals). Likewise, before goals are added, moved to an earlier date or portfolio risk is increased, thus setting a new expectation for the client, it is also important that there is fairly high confidence the addition or increase in the goals will not need to be compromised again at some future date if they remain unchanged by the client. Therefore depending on the approach used to calculate probabilities and how well the assumptions are designed to calculate the probabilities, the preferred embodiment would have more than half of random market environments requiring no change, less than one in five requiring a compromise and the remaining environments requiring a positive change to goals, or reduction in portfolio risk, assuming client goals are unchanged and the uncertainty of active investing is avoided (These are approximations meant to convey the notion that clients would be more satisfied with an approach where portfolio results enabled what was anticipated, or planned on, is either on track or better in a significant majority of client review meetings). This method accomplishes this by defining the comfort zone where normal market environments do not require new advice (unless the client changes their goals or priorities), where particularly poor markets must be probabilistically extreme to require compromising advice, and where fairly frequent positive random markets results in occasional, but more frequent (than negative outcomes), opportunities to produce advice about improvements to goals (or portfolio risk reduction). Such a relationship with a financial advisor, where things are normally "on track", where poor markets are "still on track", where extremely poor markets have some prudent advice solutions that are unlikely to be extreme and where occasional favorable markets have positive advice improvements, dramatically improves the comfort and confidence the client has in the advisor, and the advisor's advice and more importantly about the client's lifestyles An example of defining such a range would be calculating all of die future portfolio values throughout the client's time horizon needed to have 75% confidence of exceeding the client's currently recommended goals (ice, 750 of 1000 statistically potential portfolio results) and the portfolio values that would have 90% confidence (i.e. 900 of 1000 statistically potential portfolio results) in exceeding all of the client goals (See FIG. 5).

BRIEF DESCRIPTION OF THE FIGURES

FIG. 3 is an exemplary goal prioritization matrix in accordance with the present method;

DETAILED DESCRIPTION

Figure 1A:
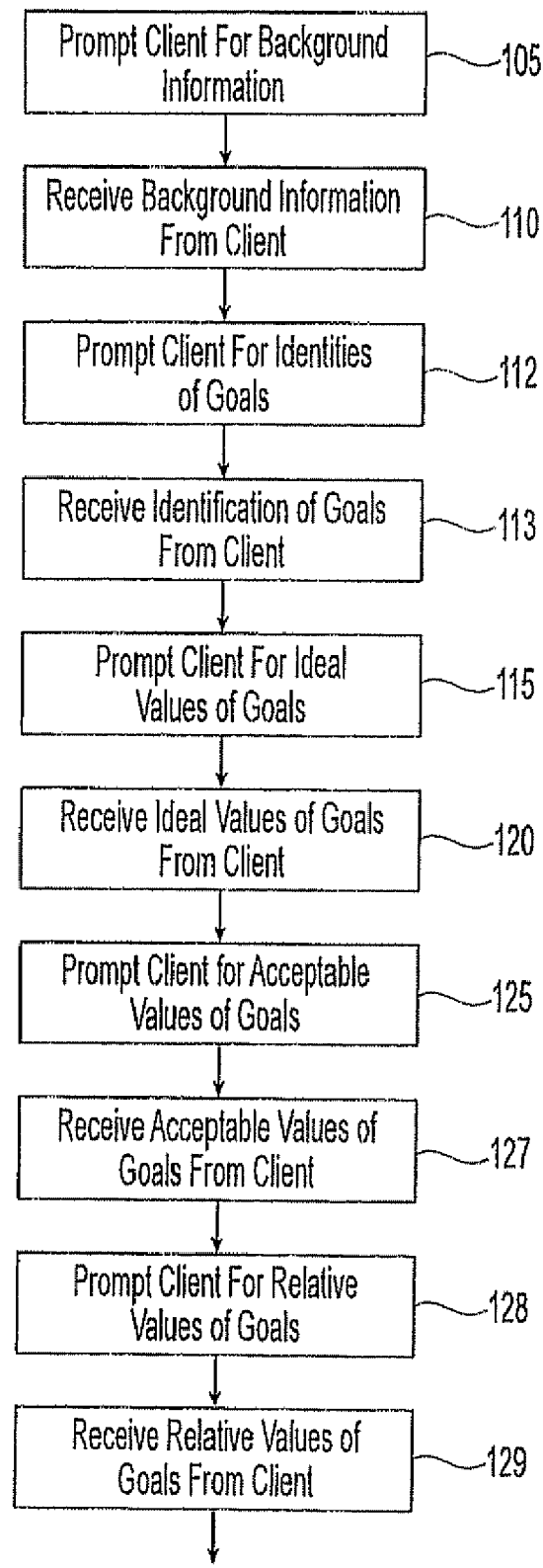
FIGS. 1A to 1C constitute a flow diagram outlining the method of the present invention.

A new method for financial advising is disclosed with the goal of finding a balance for the client between insufficient confidence (i.e. too much uncertainty) and unnecessary sacrifice. Current techniques attempt to identify the client's maximum tolerance for risk, and then to optimize asset allocation based on that maximum risk, without consideration of whether such risk is warranted. The client is periodically advised of the status of their portfolio based on actual performance of the markets Typically, this status review consists of a recitation of the performance of the client's portfolio compared to the market. Less often, the client is provided with an updated % risk of not achieving their stated goals, or current probability of "achieving" goals (which is actually the chance of exceeding, but rarely is disclosed as such). If actual performance of the client's investment portfolio is poor, the client will usually be advised to stick to their long term plan in hope that things work out in the long term or less frequently to increase contributions to the portfolio or to eliminate one or more of their low-ranked goals. Alternatively, if performance is better than expected, the client may be advised to make no changes (even if it would be possible for the client to contribute less, while still maintaining the same risk of exceeding their investment goals).

The present method is intended to help the client make the most of the one life they have, by confidently achieving the goals the client uniquely values, without needlessly sacrificing their current lifestyle and by avoiding unnecessary investment risks. Thus, the method obtains from clients only that information that is necessary and material for the advisor to understand the client's goals. It identifies the ideal dreams of the client as well as the acceptable compromises, and the priorities and proportion in amount and timing among each. It also avoids unnecessary risk, and provides performance benchmarks that are practically understandable to the client (e.g. "buying the beach house.") It further provides a comfort range based on a rational level of confidence in performance of the investment alternatives, thereby avoiding too much uncertainty as well as too much sacrifice. It provides a means of working with the client to provide solutions based on acceptable compromises to achieve prioritized goals, and provides the client with an understandable analysis of the progress made toward goals, while allowing the client to change goals or priorities on demand.

Thus, the method is used to subject the client to no more risk than is necessary to achieve the client's goals (ices no more investment risk than is necessary to permit the client to live life in the best possible way while achieving the goals that the client values most highly or partially in proportion to other goals).

Additionally, the method implements a new notion of how each of the client's goals interrelate to one another, and the number of goal achievement options that exist depending on the client's desires. The method comprises organizing a range of goals, interrelating their timing (i.e. when each is expected to be "achieved"), and amounts (i.e. the relative dollar "cost" of each goal)

The method allows the advisor and client to reorient and re-evaluate goals going forward as a means for reconfiguring the client's portfolio and desired goals for the future. Thus, based on actual market performance, the client can be advised (or at least presented with the option) to change or reprioritize their goals or reduce or increase investment risk. For example the client may be advised that their highly valued investment goals can be achieved simply by delaying retirement for one year (the date of retirement in this case is not a critically valued goal of the client), or by dropping the number of annual vacation trips at retirement from 4 to 1 Furthermore, the method allows the advisor and client to make slight changes in goal priorities that could allow the client to keep a low-ranked goal, even though portfolio performance has been lower than normal. This differs from present methods in which advisors simply advise the client to "wait for the long term" (i.e. no action) save more money or eliminate one or more of the lowest ranked goals when the portfolio performs poorly.

In one aspect of the invention, an assessment of goals of an investor is carried out by a financial advisor. The financial advisor may be an individual, an organization, or one or more organizations, and may include the use of programmed computers. The investor may be any legal or natural person or group of persons. Typically, the investor will be an individual or couple, but could also be an institution that has an investment portfolio and liabilities it wishes to fund like an endowment, pension find, or foundation. The example below is tailored to financial advising for individuals or couples However, such principles may be applied to investors other than individuals; for example, these principles may be applied to charities seeking proper management of funds or endowments. In this example, a financial advisor will obtain certain information from the individual or couple, who will be referred to as the client.

Referring to FIG. 1A, the financial advisor may ask the client for certain background information at step 105. This information is typically briefer and easier to obtain than the type of information typically required in designing a financial plan. Because of the amount of uncertainties in the future, the information collected does not need to be as arduous as is typical in planning because there are many details that are immaterial in the context of the overall vast uncertainty of the future. In general, such information includes broad but not detailed information about the client and the client's current finances, information about anticipated future income of the client, and the like. Information about the client includes such as age (or ages if the "client" is a couple), current assets, current income, current residence, and current expenses. Information about future income will be in the nature of assumptions as to future income from sources other than investments, such as earned income, Social Security, pensions and other sources of resources. Residence is important for calculation the impact of local taxes, including state, count and municipal taxes. The nature of this information will vary if the technique is applied to investors or clients who are not individuals.

Having received this relatively straightforward information at step 110, the financial advisor now asks the client to identify their goals, as at block 112. Goals typically include the availability of resources at various times, such as a range of annual income during retirement, a desired range of funds in an estate at a particular point, a range of desires for antici-pated large expenditures, such as educational expenses for a child, major future purchases such as a vacation home, a retirement vacation travel budget, a desired estate value at death, or any other expenditure of any description. Goals can be relatively serious or frivolous, and no accounting between the two is made during the goal identification phase of the method because traditional financial planning methods have advisors coaching clients about being realistic in goal setting which eliminates the potential for achieving "frivolous" goals this method of financial advising would enable. Furthermore, the kinds of goals will vary between clients. For example, a childless couple may have no need for an estate or to pay for education. The advisor should be careful to elicit all of the goals of the clients including both common goals and those that are rare or even unique to the client. The advisor, having obtained the identity of the goals, at block 113, then can ask the client to identify an ideal value of each goal, as at step 115. Values of goals can be in the form of an ideal retirement age, or an ideal number of annual vacation trips during retirement. Other values can be in the nature of one or more planned cash withdrawals at one or more defined points in the future, or for recurring expenses or a future major expense (e.g. "the beach house"). The value of goals may also include amounts and timing of savings to be added to the portfolio prior to retirement.

Ideal values of goals are those values which the client most prefers in each separate category, without regard to whether achieving each of those ideal values is realistic. The advisor should communicate that the ideal goals need not be realistic, all taken together. In general, clients will want to save less, retire sooner, avoid risk, have a greater retirement income, and have a larger estate, and the ideal values of goals will reflect these desires. Any appropriate verbal formulation may be used by the client and advisor to communicate the ideal value of each goal. The ideal value can be expressed variously depending on the nature of the goal, as noted above, in terms of timing (ideally as soon as possible) and values (ideally as much as possible). The ideal values of goals are received by the advisor, as indicated by block 120, and recorded.

The advisor can then ask the client to identify "acceptable" values of each goal, as indicated by block 125. An acceptable value of a goal will generally the a smaller dollar value, such as of annual retirement income, an estate, funding for education of children, or a large future purchase or a later date, such as when one retires or a later date for a large future purchase that the client would find as acceptable, i.e. they would be satisfied compromising the goal (or delaying it) to that level if it were necessary to achieve another goal they personally valued more.

It should be noted that the acceptable size or timing of a goal is not the smallest or latest bearable or tolerable amount, but rather is the amount that is sufficient for the client to be reasonably pleased. When a value represents a time, such as retirement age or a date of a major future purchase, to be deemed an acceptable value of that goal, the date must be sufficiently soon that the client will be reasonably happy. It will be understood that a variety of verbal formulations can be used by the client and advisor to communicate the acceptable value of each goal. The acceptable goals are received, as indicated at block 127.

Figure 2:
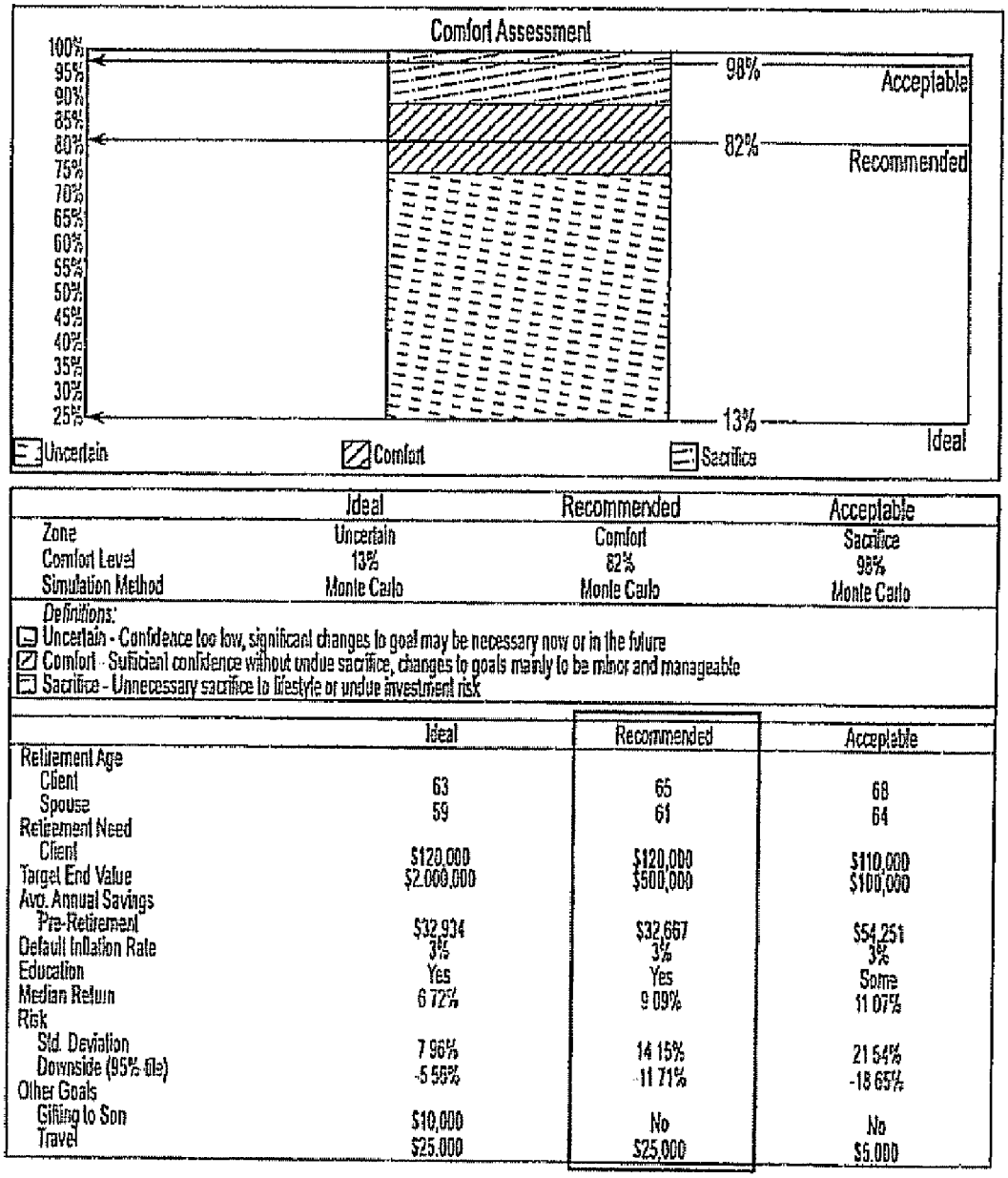
FIG. 2 is an exemplary report generated in accordance with the present method.

An exemplary illustration of ideal and acceptable values for a variety of goals is shown in FIG. 2, in which the "client" has identified an ideal retirement age of 63 years, and an acceptable retirement age of 68 years. Likewise the client has identified an ideal travel budget goal of $25,000 and an acceptable value of $5,000.

Upon receipt of these values, the client is then asked to provide relative values for each of the goals, as indicated at block 128. These must be provided in a numerical form for purposes of calculation, but can be obtained in verbal form from a client and then converted to a numerical form through interpretation by the advisor The client may be prompted to provide the relative value, of for example, achieving an earlier retirement date, versus their lifestyle once retired, of increasing the amount saved each year prior to retirement, of reducing their travel budget prior to or during retirement, of reducing the amount of an estate, of reducing the maximum amount available for education of children, and the like. For example, while it may be acceptable to have a $5,000 travel budget, would it be worth it to you to delay retirement one year if it meant you could have a $10,000 retirement travel budget. The set of relative values may involve, if done in other methods without the limiting bounds of ideal and acceptable profiling as in this method, a rather unwieldy large set of questions, which could be presented in the format of a questionnaire But this method, having the constrained bounds of ideal and acceptable goals to work from, simplifies the process to merely giving a relative value contrast amongst goals, learned by the advisor in a simple conversation or perhaps with the aid of a simple goal matrix.

There are numerous manners of inquiring about such preferences. For example, relative weighting may be inquired in a verbal format, such as "Is an early retirement as important as, less important than, much less important than, more important than, or much more important than, having additional income during retirement?" The questions may be asked with quantitative values, such as "Is delaying retirement by five years about the same as, much preferable to, somewhat preferable to, somewhat less preferable to, or very much less preferable to, having $3,000 less in annual spending during retirement?" As goals are generally expressed in terms of timing and monetary amounts, the comparisons will involve relative weighing of these types of values. As will be appreciated, this manner of questioning and of relative weighing of goals can and will be applied to all of the goals identified by the client so that a comprehensive interrelation of goals is developed and will be conceptually understood by the financial advisor for him or her to formulate their recommendation for the client. This conceptual interrelation will enable the client and financial advisor to obtain a deeper understanding of the relative importance of each of the client's goals that is substantially more nuanced than techniques in the prior art that require the client simply to rank goals in ascending or descending order. The interrelation can provide insights to the client themselves about the relationships of goals in a way that they may not have previously considered nor understood.

Ultimately, a goal matrix is developed, similar to the one illustrated in FIG. 3, in which goals are listed on the vertical and acceptable compromises are listed on the horizontal. As can be seen, the matrix can provide an easy visual comparison of each individual goal against each other goal. In the illustrated embodiment, the client has identified that in order to reduce the investment risk in the portfolio, they would be willing to retire later and/or reduce the size of their estate. A further analysis shows that, as to the latter two goals, the client would be willing to reduce the size of their estate in order to achieve their early retirement age. Arranging goals in a matrix allows the financial advisor to determine the relative importance of each goal compared to each other goal, which then allows the advisor to propose a recommendation that provides sufficient confidence and comfort of achieving or exceeding those goals each client uniquely values, without unnecessary sacrifice to their lifestyle and avoids unnecessary investment risks. Alternatively, the financial advisor can use the matrix to identify lower ranked (perhaps even frivolous) goals which can be achieved either through a minor change in the client's investment allocation (i.e. a minor increase in investment risk) or only slightly reducing or delaying other goals. Providing such an additional benefit to the client will result in significant customer satisfaction, compared to traditional practices of profiling the client to be realistic at the beginning which would ignore what would otherwise be considered a frivolous goal, or in simple ranking methods where frivolous goals would be completely eliminated due to their low rank.

The use of a matrix provides an additional advantage, in that it can point out apparent contradictions in the client's relative valuations of goals As can be seen from FIG. 3, a contradiction appears in the client's prioritization of retirement age and estate size. The client in this example has identified that in order to achieve their early retirement age they would be willing to reduce the size of their estate, however, they have also identified that in order to achieve their estate goal they would be willing to retire later. The identification of this contradiction highlights the many times fine differences exist between goal values, and thus can be used by the advisor and the client to obtain a deeper understanding of the actual relative prioritization of these goals. In the illustrated example, upon identifying the conflict, the advisor could ask the client more detailed questions about their relative prioritization of estate value versus retirement age or if there are preferred values for either between the ideal and acceptable extremes the advisor may want to consider when designing a recommendation. For example, if delaying retirement by only one year confidently "buys" an estate equal to what the couple inherited from their parents of say perhaps $500,000 (far above the acceptable minimum estate, yet far below the ideal as well) the client may be willing to make that trade of delaying retirement one year. Likewise, the client may be willing to compromise their estate below that $500,000 number if many other goals (travel budget, retirement lifestyle, retirement age etc.) must be compromised to only acceptable levels to have sufficient overall confidence.

After receipt of the relative goal value information, as indicated at block 129, the financial advisor uses the matrix to develop a recommendation, as indicated at block 130. In the analysis, the ideal and acceptable values of goals are taken as extremes of each of the goals (i.e. they are bookends) Each goal has a representative dollar value of achievement (e.g. cost of the "beach house," cost of "child's college tuition", both in ideal—the most, and acceptable, i.e. adequate—i.e. life is still good, not a sacrifice) These assembled values along with the advisor's understanding of the relative priorities amongst goals are used by the advisor to build a recommendation.

The advisor then uses these values and performs simulations of various model allocations, and making assumptions about the future performance of the associated capital markets. The advisor uses the results of these simulations in combination with the goals matrix of FIG. 3 to determine which model allocation will allow the client to achieve their most highly valued goals, which goals, if any, will need to be adjusted closer to their "acceptable" value, and which goals can be achieved at or near their "ideal" value. Likewise, using this method the advisor can also recommend which lower value goals can be achieved with only slight modifications to the values of other goals (e.g. increase pre retirement savings by $X to achieve one more Jamaica trip per year in retirement).

As will be appreciated by one of ordinary skill in the art, a variety simulations can be performed. In a preferred embodiment of the inventive method, the capital market assumptions are those based on the assumption that assets in a portfolio will be invested passively. As previously discussed, investing in actively managed investment alternatives carries a risk of materially underperforming the relevant asset classes to which the investment belongs thereby introducing a risk not being modeled if one uses only the risk and return characteristics of the asset classes. Although actively managed investments also carry the potential for returns that are substantially above those of the associated asset class or classes, it is known that any active implementation has the potential for a wide range of possible outcomes (from materially underperforming the market or asset class to substantially out-performing the market, and all points in between) thus also carrying and introducing a level of risk that is difficult, if not impossible, to adequately predict, and thus can provide widely varying outcomes from year to year. Also, in the absence of being able to know this risk, any confidence numbers presented to the client can be substantially flawed if this additional risk beyond the asset class uncertainty was not considered. Saying a client has 82% confidence if investing in these asset classes (i.e., passively) may be a reasonably and directionally sound representation. However, saying the client has 82% confidence based on the asset classes modeled, then investing in a manner that introduces an opportunity for exceeding market results and a risk of materially underperforming market results (neither of which were modeled) makes that confidence number of questionable value to the client because it can be substantially flawed Thus, recommendations should not include investing any assets in any actively-managed fund. The fact that a given fund or fund manager has done better than the markets in the past is not an indication that the fund will be more successful in the future. The uncertainties involved in investing in any manner other than fully passive investment create a divergence between the predicted probability. Rather, the inclusion of actively managed fiends in a recommendation creates an additional element of uncertainty. Moreover, there is no reliable model for predicting this additional element of uncertainty, although one can model potential impacts of the amount of uncertainty introduced and based on the confidence and comfort targeted under this method, even a small amount of active uncertainty (i.e. well below any actual historical ranges) introduces an irrational investment risk that could be avoided With a managed find, one cannot use statistical techniques to accurately model the risk of underperforming or outperforming the market but the possible risk it introduces can conceptually be estimated and shown to be an irrational risk this method of advising would avoid based upon a key tenet of the method of avoiding unnecessary investment risks.

By contrast, the use of passive investment alternatives provides a relatively high degree of predictability to the forecast simulations. Although such investments have essentially no chance of ever significantly outperforming the associated asset class or classes, but likewise they will never materially under perform their classes by more than their expenses which can be accurately modeled. Thus, passive investments form the basis for investing using the present method, by avoiding the unnecessary risk of potentially material market under-performance.

The model used to simulate market results is preferably one that bears a realistic relationship to actual historical market returns. However, a well-designed model should not slavishly follow the data available for historical markets. Historical market data is available for only a limited period of time, and only represents a portion of the outcomes possible in the future. A well-designed model is valid regardless of short-term market changes. A model that slavishly follows market returns, such as modeling based on the most recent twenty years, changes each time new data is added. Even for long periods of time, such as 30 years, the limited historical data the industry has shows that for volatile assets like large cap stocks, 30-year returns based on monthly data back to 1926 show a 30-year average return ranging from 7.17% to 14.29%. If one uses either of these 30-year results as an input to a simulation engine, they would be simulating a 50% chance of doing better or worse than the market has ever done, which is statistically erroneous. Such dependence on trailing returns is not appropriate for a reliable model of market behavior. Indeed, depending on the time period selected, there will be significant variation when a model based on trailing returns is tested against actual historical returns. A model with higher levels of confidence will not be so dependent on the data. A model using Monte Carlo analysis is preferred to model the possible future results to enable the expansion of the probability that we have not yet seen either the best or worst the markets may produce.

A well-designed model will show various defined characteristics when compared with historical results. Of course, in conducting such a comparison, it should be kept in mind that historical results represent a relatively short period, and a relatively small number of potential results. A well-designed model should include results, in such areas as average return and standard deviation, at the extremes that fall beyond actual historical results. For example, at the 5th and 95th percentiles, simulated results should be respectively, higher and lower than the 5th and 95th percentile for historical results depending on the number of simulations being run . . . i.e. mathematically the greater extremes will exist in larger number of simulations, though their probabilities of occurrence once a statistically valid number of simulations has been run will be too remote of a probability to be useful in advising a client about a dynamic and changing set of goals and priorities. The best and worst results should be better and worse than the best and worst historical results. Otherwise, the simulation would indicate that the worst or best possible results had occurred in the relatively short period of time for which there is accurate data. The amount of the variation should depend on the volatility of the asset class. For example, simulated results will be very close to real results at the 50th percentile for Treasury bills, and will generally be further away from real results as the market becomes more volatile, such as small capitalization stocks. Testing should also indicate that the variation between the simulated returns and actual returns, at the extremes, is greater in asset classes with higher volatility For example, the best and worst results for small cap stocks are likely to be significantly better and worse, respectively, than fie historical results If the model is found not to predict results along the foregoing lines, then the model may be found to be unrealistic. The modeling assumptions should then be adjusted.

Asset classes can include all U.S. stocks, U.S. large capitalization stocks, U.S. large capital growth stocks, one or more foreign markets, U.S. mid-capitalization stocks, U.S. small capitalization stocks, Treasury bills and bonds, corporate and municipal bonds of various maturity, cash, cash equivalents, and other classes of assets.

The testing of the model should take into account variations in historical markets. For example, using randomly-selected historical results in the generation of returns in a Monte Carlo simulation can result in obtaining an excessive number of selected results from either bull or bear markets. If data from those markets appears excessively in simulated returns, the simulated returns can be skewed excessively in a positive or negative direction. Thus, the inputs for the Monte Carlo data should be selected so that unusual results, such as those from the unusual bull markets of the 1990's, or those from the long bear market of 2000 to 2003, are not over represented.

Models which are found to predict that an excessive percentage of outcomes will be worse than history are inappropriate, as a plan based on such a model is likely to result in unnecessary sacrifice to the lifestyle of the client. Similarly, models which are found to result in an inappropriately large percentage of outcomes superior to history will overstate the confidence that the client can have in the recommendation. Models that fail to account for fluctuations in markets (e.g., assuming a constant annual rate of return) will miss significant risks associated with market fluctuations and completely ignore the uncertainty of future markets.

By employing these simulated return techniques, the advisor designs an appropriate recommendation for the client. In the process of designing a recommendation, the financial advisor tests the effect and sensitivity to various goals based on their conceptual understanding of relative priorities and iteratively works their way to the best solution among the goals, priorities and desire to avoid or tolerance to accept investment risk. The recommendation that results will at a minimum fulfill at least all of the acceptable values and dates of the goals of the client while providing as little deviation as possible from the ideal values of those goals that the client has indicated are most important. The goal matrix is used in this process. This may be an iterative process for the advisor, and it may involve the creation of a number of test plans that are developed and compared using the goals matrix. While one might be tempted to create a testing algorithm, the required inputs would be unwieldy as previously discussed and the practical reality that the client's goals and priorities will change throughout their life anyway (client's are not clairvoyant) make such an effort a rather useless expense of energy and lead to a false sense of precision that is inadvisable considering the vast uncertainties of the future.

The financial advisor will develop these recommendations using a computer having various background information relating to the client stored therein. Thus, the client's background information will typically be stored in memory or on some form of storage medium, and a program running on the computer (or a connected computer via a network connection) will use the background information in concert with the market simulation techniques to develop the recommendation. The recommendation will include a current asset amount, the time and amount of all contributions currently planned) to the portfolio assets, the time and amount of all withdrawals (currently planned) from the portfolio assets, and allocations of assets among one or more classes of passive investments, which allocations may be constant or may change at various times.

The appropriate recommendation will have sufficient but not excessive confidence of exceeding a recommended result for each goal, not better than the ideal value and not worse than the acceptable value. As previously noted, a recommendation with better than the ideal value of a goal is considered undesirable, because it would indicate that some other goal has been sacrificed unnecessarily or that the client is sacrificing too much by contributing more to the portfolio than is necessary and thus will have less cash available for present (i.e. non-retirement) use. If the ideal value of the goal has been properly elicited from the client, a target better than the ideal value will be of no or almost no additional value or utility to the client.

It will be understood that a part of the process of the evaluation under this method is running a series of simulations using appropriate modeling, as discussed above. It will be appreciated that appropriate modeling provides superior results. i.e. does riot contain un-modeled risks As previously explained, the modeling of capital markets is preferably carried out assuming passive investment alternatives. The advisor may rely on prior testing of capital market models, or may take the additional step of conducting a comparison. As indicated at step 140, the appropriateness of the model for the particular recommendation may be tested by comparing against historical results, using techniques explained in co-pending U.S. patent application Ser. No. 09/434,645, filed Nov. 5, 1999, titled "Method, System, and Computer Program for Auditing Financial Plans," to David B. Loeper, the entire contents of which is incorporated by reference herein. As noted above, if the modeled results differ significantly from historical results at the 50th percentile, or differ inappropriately at the extremes, then the model must be re-evaluated and altered to provide appropriate results. This is indicated at step 145. The recommendation can then be reevaluated, and may need to be altered by the advisor, as indicated at step 150.

The selected recommendation can then be presented to the client (step 155) in a report similar to that shown in FIG. 2, which can be part of a larger report, in electronic or hard copy form. The recommendation will include an assessment of the current confidence level, the recommended size and timing of goals, recommendations for investment, and a range of portfolio values within which it is not necessary to re-evaluate, whether any changes are needed based on the market's behavior (identified by the "comfort level" zone in FIG. 2). The portfolio value "zones" will be discussed further below in connection with FIG. 5. The recommendation includes recommended values of each goal, not better than the ideal value, and not worse than the acceptable value. Investment recommendations are preferably classes of assets which are passively invested (e.g. large cap, mid cap and small cap stocks, foreign stocks, Treasury and or municipal or corporate fixed income securities, and cash equivalents).

The client can review the recommendation, and provide feedback or question the advisor about the recommendations for the impact of alternative allocations, recommended values between the ideal and acceptable goals, etc, This could be needed due to the conceptual nature of the discussion of relative priorities. These reasons may point out an error in the data obtained as to the identity of the goals, the ideal and/or acceptable values of the goals, and/or the relative values embodied in the goal matrix. After consultation, the advisor can make the appropriate changes, and then repeat the steps above of designing a recommendation. The revised recommendation is then provided to the client.

Using the relative goal-weighting technique, it can often be found that a relatively small change in one goal (e.g. increasing retirement age by one year where client loves their job and doesn't mind working an additional year), can be sufficient to make a significant change in another goal (e.g. buying beach house 5 years earlier). In general, by increasing savings during working years, delaying retirement, and reducing spending during retirement, a greater likelihood of EXCEEDING all of the clients identified goals exists. However, it is an important feature of the present invention that the advisor and client recognize that such steps involve some certainty of sacrifice for the client, and that a recommendation that achieves too high a certainty of exceeding all or most of one's goals more goals may not be desirable because it can unduly sacrifice current or future enjoyment of the only life the client has.

Once again, the importance of investing in passive investment alternatives is considered key to providing the client with a recommendation that includes an accurate estimate of the confidence level being represented. As previously stated, a reasonable estimate of the confidence level can only be provided when both reasonable capital market assumptions are used and passive investments are assumed. If the advice to be provided were to be for investment of one or more assets in managed funds, or in individual stocks, individual parcels of real estate, or other assets that behave differently than the capital markets that were modeled, then the confidence being represented to the client will be flawed because the specific uncertainty introduced cannot be predicted with certainty, was not included in the confidence calculation and therefore cannot be modeled to produce any particular confidence level that would be representative. A recommendation of managed portfolios, carries a degree of unpredictability that makes them less desirable for use with the present method because of this uncertainty of heir future behavior (we can reasonably estimate potential market uncertainty but not how any one money manager may behave) and the importance of the confidence calculation being an reasonable estimate in the value provided in this method (an obvious contradiction exists if one is measuring and advising to have sufficient but not excessive confidence but how one implements it introduces an unknowable effect on confidence that isn't modeled).

Figure 4:
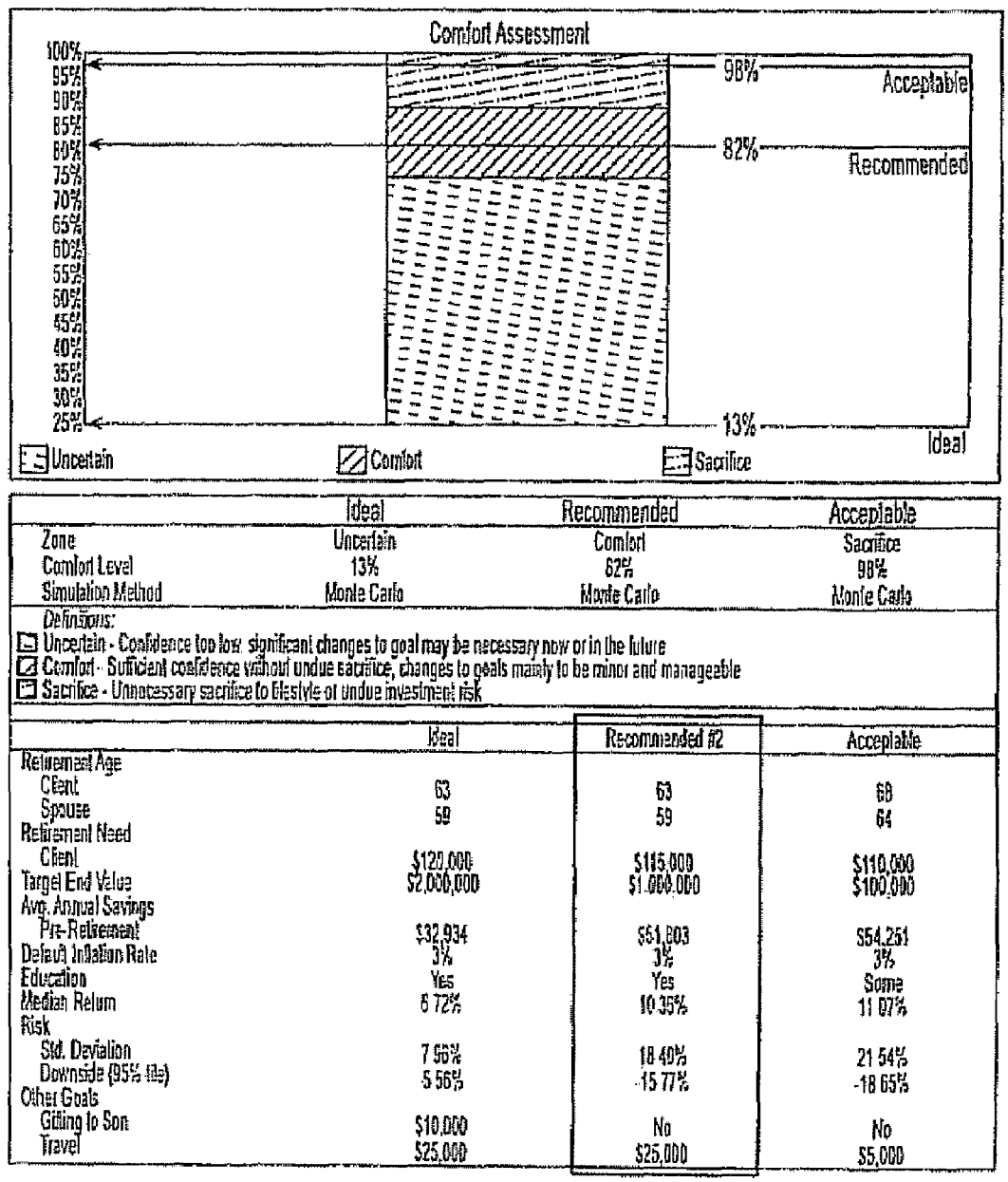
FIG. 4 is an exemplary report generated in accordance with the present method.

FIGS. 2 and 4 show an exemplary form used to convey information regarding the recommendation to a client. The method of profiling the client's goals can be understood by comparing the resulting recommendation for two clients with identical background information and ideal and acceptable values of goals, but who have different relative weightings of those goals. In the example of FIG. 2, although not shown, the client has prioritized the following goals: (a) retirement income, (b) minimum savings prior to retirement, (c) educating their son through graduate school, and (d) maximizing their travel budget in retirement. The resulting recommendation meets their desired low level of savings, annual travel budget, and support of their son's education, while other goals are compromised much closer to the acceptable level but importantly are generally not completely eliminated unless the value to the client was extraordinarily low in context of other goals. In the example of FIG. 4, the recommendation reflects goals that, although not shown, are significantly different than the previous client The highly valued goals of the client in FIG. 4 are: (a) early retirement, and (b) a minimum value of an estate—here, an estate of $1,000,000 (in this client's case their desire was to not spend principle and wanting to maintain the real spending power of their portfolio). The goals are achieved here by compromising the amount of savings prior to retirement as well as an increased investment risk.

FIGS. 2 and 4 also place the recommended, ideal and acceptable values of goals on a continuum of comfort assessment. This combined package of the client's life long goals along with the recommended investment strategy/allocation to passive investments and approximate current portfolio values are combined to calculate those future portfolio values necessary to have sufficient confidence (i.e. avoid too much uncertainty) and those potential future portfolios values that would place them at excessive confidence (i.e. too much sacrifice to their lifestyle). In this example, there are three categories: "uncertain"—where confidence is deemed too low to have reasonable comfort about one's ability to live as currently planned and recommended and the risk of undesired material changes is therefore too high, and is thus unacceptable; "sacrifice"—where there is a certainty of giving up excessive time or current or future spending and leaves one with a very high likelihood (i.e. 90%) of leaving an estate larger than planned at the price of other goals and/or unnecessary investment risk (volatility of the investment portfolio); and "comfort"—which provides an appropriate balance between the risk of too much uncertainty and too much lifestyle sacrifice. As shown in FIGS. 2 and 4, the "comfort" range resides between 75% and 90% confidence, The recommended values of goals will be somewhere within this "comfort" range. The acceptable values of goals normally fall in the "sacrifice" region, while the ideal values of goals normally reside in the "uncertain" region. While this is not necessarily always the case, ideal and acceptable sets of goals that fall in inappropriate areas offer another opportunity for the advisor to coach the client about needing to be more realistic about their acceptable goals (i.e. if the acceptable falls below the comfort zone) or to coach the client that they can have grander aspirations (i.e. if the ideal goals fall into the sacrifice zone). As the graphical display shows, there is a range of potential outcomes and targeted potential portfolio values where if one's goals remain unchanged there is no reason to be concerned. i.e. comfort This range will of course vary for the particular client.

The "comfort" or "confidence" values represent the results of the historical market analysis and/or Monte Carlo analysis of the relevant capital markets based on the passive investment allocations recommended by the financial advisor In one embodiment, 1000 market environments, both good and bad, are simulated based on thoroughly analyzed capital market assumptions designed in a manner to realistically model the nature of the potential range of capital market outcomes. The "comfort" or "confidence" level is the percentage of those 1000 simulations in which the client's goals are exceeded.

In order to appropriately implement and manage the recommendation created using the method as described so far, it is important that the advisor and client periodically monitor the effect of the capital market results on the progress being made of the recommendation in order to keep the client rationally confident about their financial future yet avoid undue sacrifice or capitalize on opportunities to reduce investment risk. As part of this monitoring step, the advisor and client can make changes necessary to maintain a recommendation within the "comfort" zone throughout its life. This periodic review is important because it allows the advisor and client to efficiently react to make appropriate changes to the recommendation when actual market performance is outside of the performance needed to maintain confidence, and avoid sacrifice. It also allows the client and advisor to address any changes to the client's goals or relative priorities among goals that have occurred since the previous review period Thus, for example, where actual market performance for the period were worse than required to maintain sufficient confidences the advisor can recommend a change in allocation, an increase in contribution amount, or a change in values and/or prioritization of goals in order to maintain the client within the "comfort" zone. Corresponding changes can be made where actual market performance for the period was better as well offering the opportunity to increase goals, obtain goals earlier, or reduce the portfolio risk.

The periodic review advantageously will also capture changes to the client's goals, or their ideal/acceptable values of those goals. This provides a degree of flexibility to the recommendation that corresponds to the natural changes in the client's life and their financial and other priorities. Thus, where the client originally identified "paying son's education expenses," as a high priority goal, this goal could be eliminated where, for example, the son receives a scholarship or decides not to attend college. Likewise, if the client is the beneficiary of a large family estate payout, the Pre-Retirement Savings value could be changed accordingly.

Additionally, even if the client does not add or delete goals, they will be requested to review their existing goal matrix to incorporate any changes to the relative prioritizations of their goals represented in the matrix.

Once any/all changes have been identified, a calculation can be made of needed portfolio values necessary for the client to remain in the "comfort" zone. These results can be provided to the user in the form of a graphical display similar to that shown in FIG. 5, in which portfolio value is indicated on the vertical axis and client age is indicated on the horizontal axis. Again, the "comfort" range is identified in the center, with "sacrifice" and "uncertain" above and below, respectively.

Figure 5:
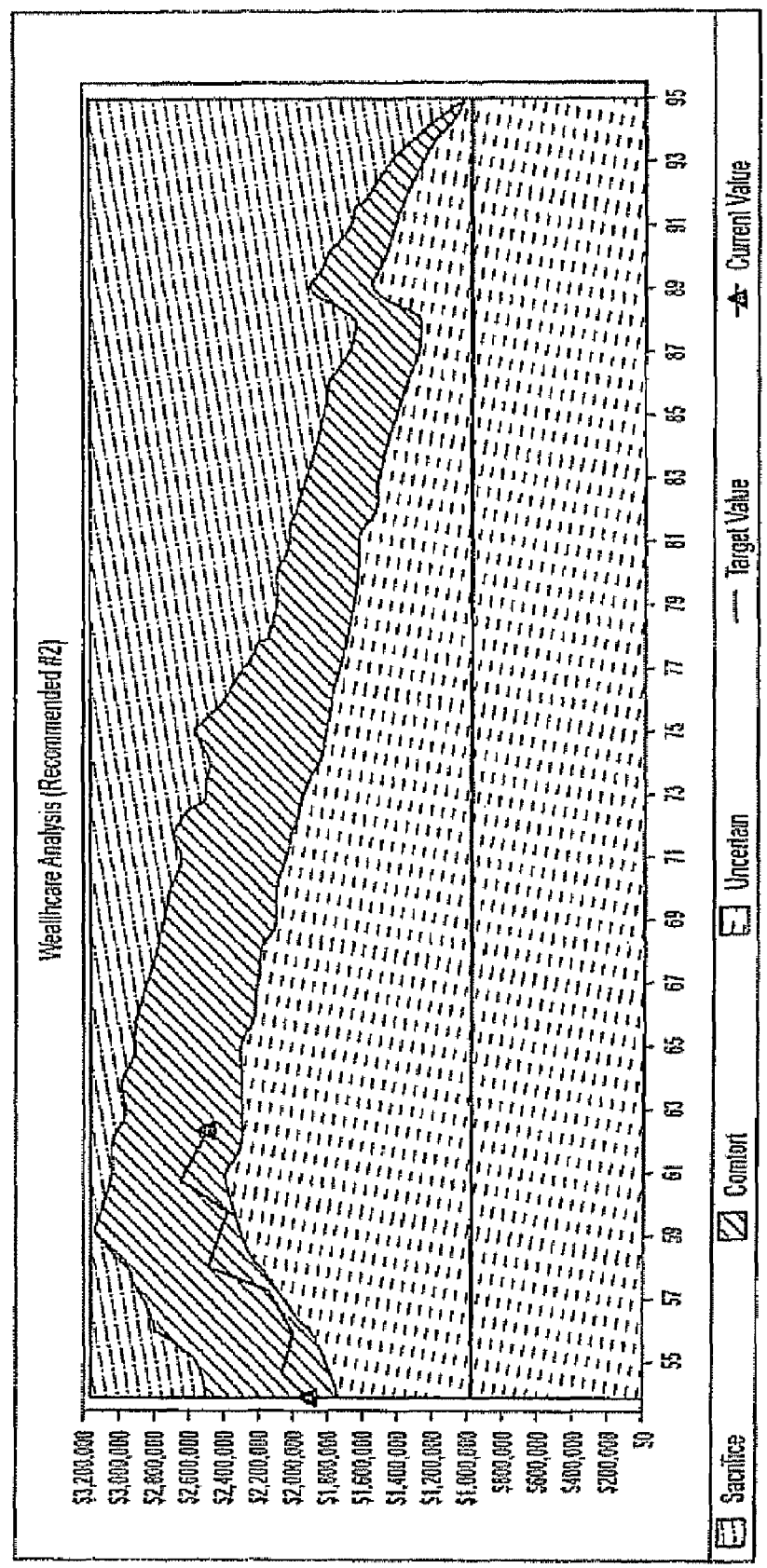
FIG. 5 is an exemplary chart generated in accordance with the present method.

It will be understood, referring to FIG. 5, that the range of portfolio values based on the uncertainty of passive portfolio allocation naturally narrows as the end point of the plan, and a certain dollar amount, is approached. Thus, the middle range in FIG. 5 represents the portfolio values that would produce 75% to 90% confidence at each year throughout the client's life. This is in contrast to current methods of probability based financial advising, in which the range of risk actually expands toward the end point of the plan.

The calculation, behind FIG. 5 for instance, that is needed to solve for the portfolio values throughout the planning horizon to maintain any targeted range of confidence levels starts with the ending point of the planning horizon (for instance an ending point based upon random mortality). The calculation is based on various behavioral rules and tax assumptions through multiple iterations and gives the amount of assets needed any amount of time in the future needed to have X confidence (sufficient) or Y confidence (excessive, i.e. sacrifice) for whatever goals would remain for that point in time forward. This method of capital market modeling simulation is called "The Reverse Iteration Algorithm."

Further discussion of the example shown in FIG. 5 is useful to better define the accounting method disclosed therein. Specifically, the calculation used to plot the graph of FIG. 5 is based on a reverse capital markets modeling iteration algorithm. The calculation begins by taking a targeted end date and portfolio value. In FIG. 5, the end date is when the client turns age 95. At present (on the graph), the client is age 54. The end portfolio value that is sought is one million dollars ($1,000,000,00). The calculation works by combining the end date and portfolio value with the investment goals of the particular client. The iteration then runs backward from the end date to the next prior date (on an annual sample) to solve for the amount of money needed the year before the end date to have targeted confidence that the goal will be reached. Without the reverse iteration algorithm, there is no way to actually calculate how much is needed to have a targeted confidence of obtaining the end portfolio value. In one example, the capital markets model is a Monte Carlo type of simulation as discussed herein. Of course, having run the reverse iteration for the year closest to the end date to solve for this value, the claimed method continues to run the algorithm to solve for the values needed each valuation point backward to the present. This is valuable, because it establishes the solved for values of what one needs in value today, or over the next year, to have a predetermined amount of confidence of obtaining the client goals.

Traditional Monte Carlo Simulation methods in the financial services industry measure the confidence level or range of all potential outcomes going forward from a fixed starting point and set of goals, cash flows, market assumptions, etc. for some fixed period of time (i.e. 35 years or 1 year or a random period of time) and solve for a confidence level of exceeding or meeting the set of goals based on the assumptions. Numerous commercial applications have been developed that solve for such confidence levels because knowing one's odds is valuable. However, there is a significant difference between knowing the odds of exceeding a result over a period of time (say 80% confidence of exceeding the desired result over the next year) and solving for the portfolio values to have sufficient, but not excessive confidence. In most commercial applications in financial services, one might know they have 80% confidence of having more than $1 million a year from now based on a series of assumptions about current portfolio values, spending and/or savings goals and market results. Through detailed evaluation of the output of such existing commercial systems, one might discover they have a 50% chance of having more than $1.1 million, and a 10% chance of having more than $1.3 million over the next year. One might also discover that there is a 10% chance of having less than $900,000 over the next year (or whatever period of time the analysis is run.) This is the essence of what is output from most commercial Monte Carlo or Probability analysis systems.

While the traditional Monte Carlo analysis is useful, there is a significant lack of information that can otherwise be discovered by the Reverse Iteration Algorithm. That information goes beyond solving for the chances of what might happen to a million dollar portfolio over the next year or two (or 30 for that matter) but instead solves for how much portfolio value would be needed to have any specific targeted confidence level. This is mathematically different than taking a fixed starting value and through random results calculating a future value. Instead this starts with an ending value and solves for a present value necessary to have a specific confidence level. Current commercial applications may solve for things such as the savings needed to produce X confidence, the portfolio allocation that would produce the highest confidence, etc but do not (due to their lack of the Reverse Iteration Algorithm) calculate the portfolio values needed to have X confidence over the course of the next year, two years, etc. for whatever goals remain at that point in time. So while in current applications, one might know only that there is a 10% chance of having less than $900,000 over the course of the next year, the Reverse Iteration Algorithm might expose that for one client such a decline might put their confidence level too low to be comfortable (i.e. less than 75% for example), while for another client, invested in the same portfolio but with somewhat different future goals, a decline of 15% would be required to cause their future confidence level to be below 75% (for example). Once these values are calculated (based on targeted confidence as used in the reverse iteration algorithm) the values that are solved for in the Reverse Iteration Algorithm can then be combined with traditional Monte Carlo Simulation to solve for the odds of the portfolio incurring such a decline. So while traditional Monte Carlo Simulation or other Probability Analysis Methods might be able to solve for the odds of the portfolio being worth less than $900,000 over the next year, the absence of targeted confidence and the Reverse Iteration Algorithm does not enable them to disclose the amount needed to have any particular confidence level at any point in time, nor does it disclose the odds of the portfolio performing in a manner that would cause one to drop below their targeted confidence level, nor does it tell them the odds of the portfolio performing in a manner that would produce excessive confidence, nor is it able to calculate the odds of the portfolio remaining within a desired confidence range. These are obviously all useful results that could expose risks that it would be helpful to anticipate or provide comfort the risks might be low. This comfort as well as disclosure of risks that the combination of Monte Carlo Simulation for portfolio values along with the previously disclosed method of solving for portfolio values needed (the Reverse Iteration Algorithm) for targeted confidence enable advisors for the first time to provide comfort based on a unique set of client goals. The graphical difference between tradition Monte Carlo and the Reverse Interation Algorithm demonstrated in FIG. 5 where the comfort zone range of values converge at the end of the plan where in typical Monte Carlo Simulation the range of future values diverge.

Returning again to FIG. 5, the assumptions made in addition to the target end date and portfolio value to obtain the points on the graph include any spending or other goals, other resources available like pensions that could pay for said goals, taxes that might need to be paid on capital gains, interest and dividends on the portfolio(s) and pension, the investment allocation and associated capital market assumptions that determine the range of potential outcomes, etc.

Using the inventive method, the financial advisor and client are able to make periodic adjustments to the client's recommendation in order to ensure it remains within the "comfort" zone. The financial advisor will advise the client to review and change the portfolio if the value approaches the edge of, or falls outside of, the comfort zone If the markets have unexpectedly high returns, such as those from an extraordinarily unusual bull market, for a time period near the beginning of the recommendation, the plan assets, or portfolio assets, will likely exceed the upper limit for that year (or other time period). Thus, the advisor can recommend a change to the recommendation that would move the plan from the "sacrifice" zone back down into the "comfort," zone. Such changes could, for example, include a reduction in Annual Savings (FIGS. 2, 4), a reduction in portfolio risk, increasing planned retirement income, etc. Alternatively, if the markets have returns that produce portfolio values less than the lower limit of the comfort zone, the advisor would recommend similar changes to the plan (e.g., a change to goals or values of goals, increase investment risk or timing of goals) to place it back within the "comfort" zone. As previously mentioned, how often such events occur is controlled by the target confidence range. If the range were in the middle, say a comfort range of 43-57%, many market environments would require significant reductions to goals (nearly half) Whereas if the range is too small, say 80-82%, while negative adjustments would be less frequent, positive changes would occur very frequently only with a frequent likelihood of needing to be reduced once again in the future. While the specific values of 75-90% are riot rigidly required (obviously these are dependent on how the capital market assumptions are built as well) the notion is that market behavior driven changes are not frequent and are unlikely to be very extreme by measuring confidence toward a tail of the distribution with the odds tilted in favor of exceeding client goals (clients can change their goals and priorities at any time and is obviously always better to get a better understanding of what how they would like to live their life), and positive changes to goal recommendations are more frequent than reductions or delays in goals, and that positive improvements to recommendations (enhancing recommended goals) are no more likely to need to be reduced again later than any recommendation previously made (again, controlled by measuring confidence toward the distribution tail that favors odds tilted toward exceeding the results).

Likewise, if there is a bias in the capital market assumptions which caused the modeling to be inaccurate, the portfolio value review will tend to reveal such assumptions. For example, if the assumptions were overly pessimistic, the portfolio value might tend toward the upper limit of the comfort zone. If the assumptions were overly optimistic, the portfolio value might tend toward the lower limit of the comfort zone. Appropriate changes to the assumptions can then be implemented.

Figure 1B:
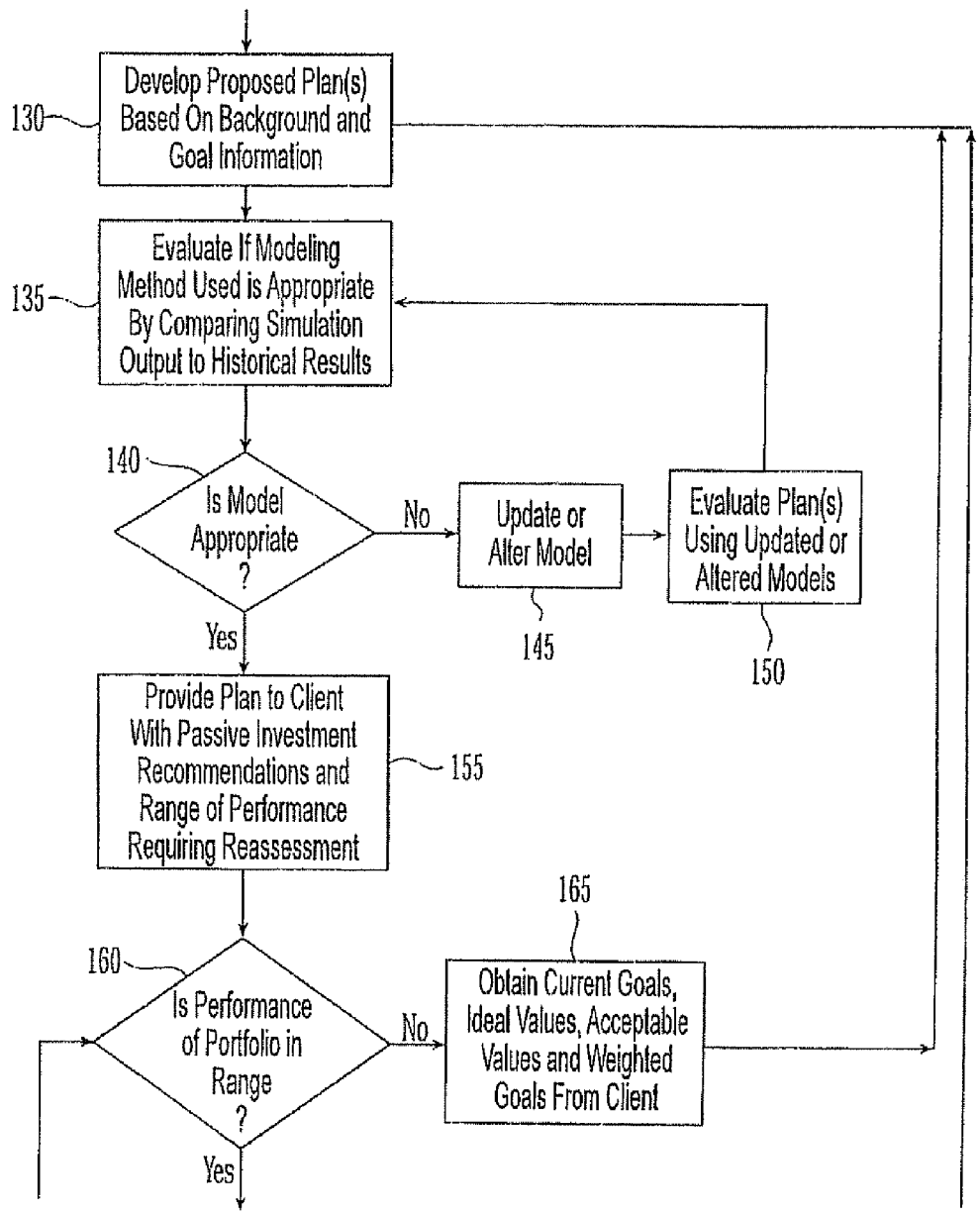
Figure 1C:
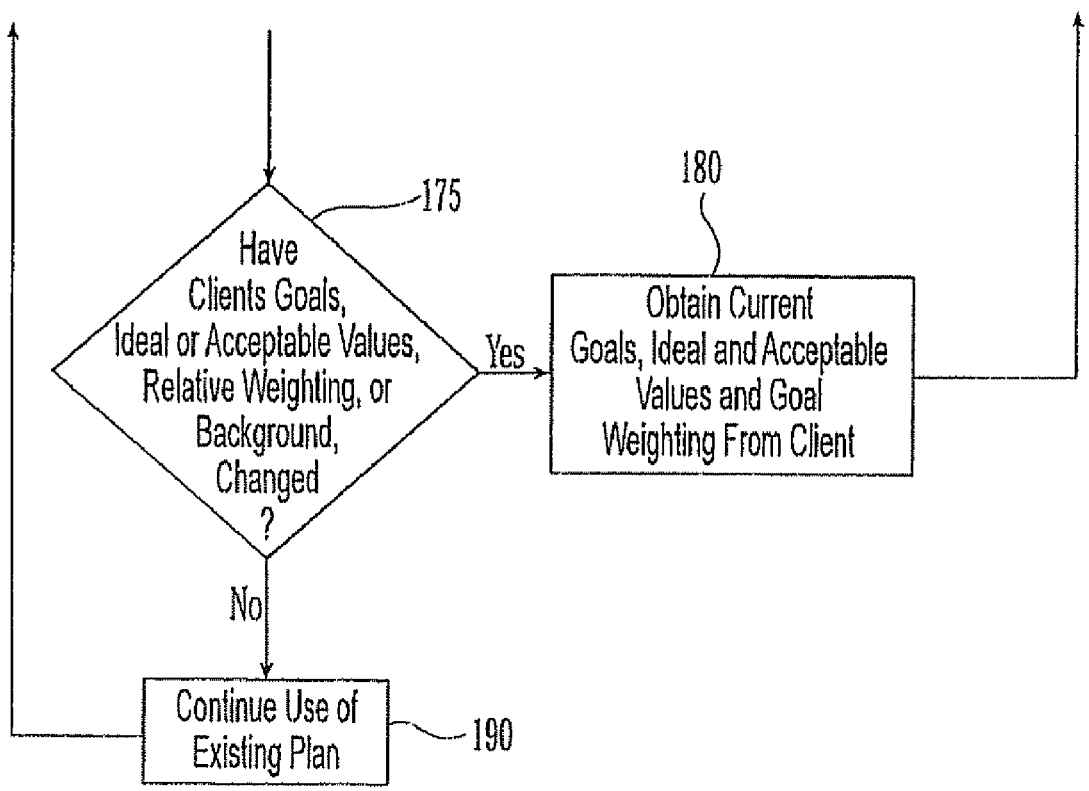

Referring to FIG. 1B, the step of monitoring the current status of the recommendation and making appropriate changes is indicated at step 160, while the step or reassessing client goals is indicated at step 165, and the step of preparing new recommendations based on those goals and the client's current situation and evaluating the model used to generate such recommendation is indicated at steps 130-150. It is noted that the timing of this periodic review is not critical, though in a preferred embodiment the review would occur at least quarterly. When an alteration occurs in the clients goals or their relative importance, as noted in block 175, the financial advisor must obtain the client's new range of ideal and acceptable goals and/or their new relative weighting, as indicated at step 180. The financial advisor then prepares a new recommendation for consideration, incorporating the client's current goals and relative perceived values, and develops a proposed recommendation based on the modified goal information, as indicated at block 130. A revised recommendation is presented to the client (step 155), along with a range of portfolio values within which the client would remain in the comfort zone and would therefore not require reassessment if goals and priorities have not changed. If the performance of the markets (and therefore also the passively invested portfolios) which cannot materially under perform the markets and assuming the cost of such passive investments incorporated in the analysis) is within the appropriate range, and the client's goals have not changed, then the current recommendation, with current passive investments, is used, as indicated by step 190.

Providing the client with an assessment similar to that of FIG. 5 is highly advantageous to the client because it provides a clear and easily understandable indication of progress toward the goals they wish to plan their life around, and clearly places that progress within the context of the balance between undue sacrifice and excessive uncertainty previously discussed. Using the present method, the client will easily be able to tell, based on what has happened with the performance of the portfolio, when a change in the recommendation is required to maintain that balance.

The present method significantly differs from conventional prior art methods in that prior art methods often attempt to assess the risk based merely on a client's stated willingness to endure losses in their portfolio or some other mathematical method. Such a willingness to endure risk bears little or no relationship to whether accepting such risk makes sense for what the client wishes to achieve when considering acceptable compromises to goals that would enable them to accept less investment risk Also, using such a prior art risk assessment, the client has no way of knowing whether or when losses incurred as time passes are sufficient to trigger a review of the traditional financial plan.

The present method also differs from the prior art in that it employs passive investments whose potential wide range of future potential behavior can be relatively accurately estimated. This is in contrast with typical financial planning systems which advocate the use of actively managed investment alternatives, which introduce a risk that the client's portfolio may materially under perform the associated asset classes, and whose future behavior can not be accurately estimated.

It should be noted that the client should be advised that a reassessment of the recommendation is advisable whenever a goal is added/deleted, the ideal or acceptable values of an existing goal has changed, or the relative priorities of any of the existing goals has changed (step 175). The same is true for changes in background information, such as where a client receives a significant inheritance, thereby increasing the present portfolio balance. Previously acceptable goals for savings may become unattainable, such as where a client loses a job and is therefore forced to save less or when the client receives a promotion that may make additional savings less of a burden and thereby enabling more, or greater, or sooner goals to be modified, or portfolio risk reduced. Additionally, acceptable and ideal values of goals for post-retirement spending may change if a client is promoted and becomes accustomed to a more expensive lifestyle; a child who was expected to require substantial college tuition payments may choose not to go to college or may obtain a scholarship, thereby eliminating a goal of providing for the child's education. Likewise, a client may change jobs or careers and decide that an early retirement is of less value to then than other goals.

It will be understood that the process of monitoring the status of the recommendation and the client's goals mid their relative importance preferably will continue throughout the duration of the financial advising relationship with the client.

Aside from the arbitrary and routine scheduling of conferences with a client to monitor the status of a recommendation tat has been made to the client, an additional useful tool is a calculation of an estimated chance that the recommended investment allocation will result in a value outside the comfort zone. In other words, the particular client goals and the details of the recommended allocation for each client may significantly contribute to the chance that the recommended investment allocation will result in a value better than the ideal value and worse than the acceptable value at the end of a predetermined time period.

An illustrative example is helpful to examine the calculation of this estimated chance and how it will vary depending on different client goals. Two clients each have current portfolios worth one million dollars ($1,000,000.00). Both clients can "tolerate" 100% equLity exposure. Both clients are 60 years old. Both clients would naturally desire avoiding needless investment risk. And both clients currently have 82% confidence in meeting their goals with a particular recommended allocation. Client no. 1 wishes to accumulate an estate worth three million dollars ($3,000,000.00), and he does not plan on making any contributions or withdrawals from his portfolio. Client no. 2 is planning to retire in three years and withdraw a steady forty thousand dollars ($40,000.00) per year in real dollars and wishes only to leave one hundred thousand dollars ($100,000.00) at the end of the calculation. The analysis is run for a 35-year lifetime which corresponds to age 95 for each of the clients. The purpose of this aspect of the present invention is to account fox the uncertainly of how investments may perform over the short term within the parameters of the client goals.

For the first client with no contributions or withdrawals from his portfolio, using the Reverse Iteration Algorithm, and assuming that the goals and priorities for the client do not change, there may be a remote three out of 100 chance that any single year's market result would cause the client to fall above the comfort zone and also a three out of 100 chance of falling below the comfort zone. Therefore, given that client's unique situation, the financial advisor is able to tell the client that there is a specific estimated chance that the market performance may cause the recommended allocation or other changes to goals need to be adjusted by the end of any single year. This may assist the financial advisor and client with respect to scheduling of periodic monitoring and expose the reality of the risks of short-term market performance, or in this example, provide significant comfort that in all likelihood, things will be on track. Alternatively, the estimated chance of falling out of the comfort zone is itself a valuable number for consideration by a client.

The picture with respect to the estimated chance of falling out of the comfort zone is immensely different for client no. 2 who is retiring soon and planning on making regular distributions from his portfolio. For this client, there is a 50% likelihood that market results for his particular recommended investment allocation would have caused the client to slip into the sacrifice zone above the comfort zone. Additionally, 7% of historical results for his specific recommended investment allocation would cause his investment to drop below the comfort zone (more than twice the risk of client no. 1, but consistent with the frequency of positive meetings with the client, still a relatively low risk). The bottom line is a 57% chance that, using the Reverse Iteration Algorithm analysis, that the recommended allocation may require an adjustment in allocation or an adjustment to the client goals.

The foregoing calculation of the estimated chance is a separate tool from the comfort zone analysis otherwise described herein and as shown, for example, in FIG. 5. The estimated chance calculation is a tool for financial advisors to let them make sensible recommendations for portfolio reviews with a client. The estimated chance is useful for the client to likewise evaluate the recommended allocation and the timing of future reviews with the financial advisor.

The method of providing advice according to the invention can be generalized. In a generalized form, a method of the invention is used to provide investment advice as well as advice about the best choices about life goals given at least two goals (one being some targeted end value or series of spending goals or liabilities, and the other being the desire to avoid unnecessary investment risk). In this generalized method, a client may be an individual, corporation, or institution. Background information may include a current portfolio value, current program expenses, and current development expenses, for example. The client is prompted to identify a spending or target end goal, their tolerance for investment risk and their desire to avoid investment risk, and identify both ideal and acceptable values for each. The goals may vary depending on the nature of the client. For example, for a charitable institution engaged in planning investment of an existing or newly donated sum, the goals may include levels of investment risk, a desired annual income for programs, an annual budget for development and a desired value of a portfolio at a certain date in the future. The client is then prompted to identify relative values of such goals. A charitable institution may weigh a desire to engage in present spending against a desire to have a large sum in the future for a capital project. A recommendation under this method appropriate to the client, the goals, the ideal and acceptable values of each goal, the relative values of all goals, may then be developed. As with other recommendations, the investments must be passive, in order for the confidence assessments to be directionally accurate. A range of values on a year-by-year basis (or other time period) may be provided within which the goals of the client can be reasonably confident of exceeding such goals, yet avoiding undue sacrifice or excessive compromise to the goals can be calculated. If the value of the portfolio falls outside this range, then the recommendation should be reviewed. Similarly, if background information changes, if goals are added or deleted, or if ideal or acceptable values of goals change or the relative weight of goals change, then the recommendation should be reviewed.

The method of providing advice, including the steps of obtaining background information the client, identifying a set of client goals, identifying ideal and acceptable values for each goal, and identifying relative weighting of the various goals, and designing a recommendation with results for each goal not better than the ideal value and not worse than the acceptable value, may be applied using a variety of techniques of measuring the confidence and or likelihood of various outcomes. In one preferred embodiment, the technique of using a Monte Carlo based model of capital markets, properly considering the market's uncertainty and behavior in random time periods and specifically not ignoring the risk of active investments potential risk of material underperformance is assessed and can be used in the development, and in the future assessment of the confidence of a recommendation, even if the recommendation is not developed and reviewed using the goal-based methods set forth above.

The present invention can be embodied in the form of methods and apparatus for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes ail apparatus for practicing the invention. When implemented on a general-purpose processor, the program code segments combine with the processor to provide a unique device that operates analogously to specific logic circuits.

While the invention has been described with reference to preferred embodiments, the invention should not be regarded as limited to preferred embodiments, but to include variations within the spirit and scope of the invention.

What is claimed:

1. A method of financial advising comprising:
obtaining by a computer a list of a plurality of client investment goals from a client, and for each goal, identifying ideal and acceptable values, the ideal value of each goal being the value for that particular goal that the client most prefers to achieve, and the acceptable value of each goal being the value for that particular goal that is less preferable to the client compared to the ideal value but that is still acceptable to the client;
performing a first simulation by the computer of a plurality of model investment portfolio allocations over a first predetermined time period using a capital market modeling technique, the first simulation accounting for investments and expenditures planned to occur during the first predetermined time period;
determining by the computer, using the first simulation and the ideal and acceptable values for each goal, a recommendation comprising an investment allocation and a recommended value for each investment goal, where the recommended value for each goal is not better than the ideal value and not worse than the acceptable value and wherein the recommendation has a measured confidence of exceeding the recommended value for each goal and wherein the measured confidence is within a predefined range;
performing by the computer a second simulation of the recommended investment allocation over a second predetermined time period using the capital market modeling technique, the second simulation accounting for investments and expenditures planned to occur during the second predetermined time period; and
determining by the computer, using the second simulation of the recommended investment allocation, (1) a plurality of upper boundary portfolio values, each upper boundary portfolio value corresponding to a date in the second predetermined time period, each upper boundary portfolio value comprising an amount of money calculated to provide a first predetermined likelihood of exceeding the recommended value for each goal from a present date until the corresponding date, (2) a plurality of lower boundary portfolio values, each lower boundary portfolio value corresponding to a date in the second predetermined time period, each lower boundary portfolio value comprising an amount of money calculated to provide a second predetermined likelihood of exceeding the recommended value for each goal from a present date until the corresponding date, (3) a plurality of anticipated future portfolio values, each anticipated future portfolio value corresponding to a date in the second predetermined time period, and (4) an estimated chance that the anticipated future portfolio values will be greater than the upper boundary portfolio value on a corresponding date or be less than the lower boundary portfolio value on a corresponding date.

2. The method of claim 1, wherein the ideal and acceptable values for each goal correspond to at least one of a dollar amount or a time for achieving the goal.

3. The method of claim 1, further comprising:
communicating by the computer to the client the estimated chance obtained in the second simulation.

4. The method of claim 1, wherein the recommended investment allocation includes only passive investments.

5. The method of claim 1, wherein the capital market modeling technique comprises a reverse iteration algorithm.

6. The method of claim 5, wherein performing a first simulation of a plurality of model investment portfolio allocations using a reverse iteration algorithm comprises:
obtaining by the computer a targeted portfolio end date and a targeted portfolio end value; and
for each of a plurality of periodic dates over a time period extending from a present time to the targeted portfolio end date, determining by the computer an amount of money needed to have a targeted confidence of having the targeted portfolio end value at the targeted portfolio end date.

7. The method of claim 6, wherein the periodicity of the plurality of periodic dates is annually.

8. The method of claim 1, wherein the capital market modeling technique of the first simulation comprises a Monte Carlo analysis.

9. The method of claim 1, wherein the capital market modeling technique of the second simulation comprises a Monte Carlo analysis.

10. The method of claim 1, wherein the predetermined time period used in the second simulation is one year.

11. The method of claim 1, further comprising:
determining by the computer an initial value of a client investment portfolio.

12. The method of claim 1, further comprising:
obtaining by the computer a relative value comparison between pairs of investment goals within the list of goals;
wherein the step of determining the recommendation uses the relative value comparison between pairs of investment goals and the simulation of the plurality of portfolio allocations.

13. The method of claim 12, wherein the step of determining the recommendation using the relative value comparison between pairs of investment goals further comprises determining whether one or more low valued goals can be achieved with modifications to the values of other goals on the list.

14. The method of claim 12, wherein the step of obtaining a relative value comparison between pairs of investment goals further comprises developing a matrix of the goals that represents the relative comparison between the pairs of investment goals, and wherein the step of determining the recommendation uses the goal matrix.

15. The method of claim 12, further comprising:
periodically determining whether the client would like to add new goals or remove goals from the list of investment goals, or whether the client would like to make changes to the relative value comparison among the goals; and
re-performing by the computer the first performing and determining steps if the client has added or removed goals from the list of investment goals, or if the client has made changes to the relative value comparison.

16. The method of claim 12, wherein the relative value comparison is represented in terms of the price, in money or time, that the client is willing to pay in one goal within each pair of investment goals to achieve the other goal in the same pair of investment goals on the list.

17. The method of claim 1, wherein the ideal value of each goal is expressed either in terms of a soonest time for achieving the goal or a largest dollar value of the goal; and the acceptable value of each goal is a smaller dollar value or a later date for achieving that goal compared to the ideal value, and that is still acceptable to the client.

18. The method of claim 1, further comprising:
obtaining by the computer a client targeted end date and targeted end investment portfolio value.

19. The method of claim 1, wherein the measured confidence of exceeding the recommended value for each goal is determined by calculating a percentage of a plurality of different simulations in which the recommended value for each goal is exceeded.

20. The method of claim 19, further comprising:
comparing by the computer the calculated percentage of the plurality of different simulations in which the recommended value for each goal is exceeded to a predetermined comfort zone; and
determining by the computer if the calculated percentage falls within the comfort zone.

21. The method of claim 1, further comprising:
periodically monitoring by the computer the recommendation to determine whether, based on a current value of the client investment portfolio, the measured confidence is still within the predefined range; and
re-performing by the computer the first performing and determining steps if the measured confidence is not still within the predefined range.

22. A device for financial advising comprising:
a processor configured for obtaining a list of a plurality of client investment goals from a client, and for each goal, identifying ideal and acceptable values, the ideal value of each goal being the value for that particular goal that the client most prefers to achieve, and the acceptable value of each goal being the value for that particular goal that is less preferable to the client compared to the ideal value but that is still acceptable to the client;
the processor further configured for performing a first simulation of a plurality of model investment portfolio allocations over a first predetermined time period using a capital market modeling technique, the first simulation accounting for investments and expenditures planned to occur during the first predetermined time period;
the processor further configured for, using the first simulation and the ideal and acceptable values for each goal, determining a recommendation comprising an investment allocation and a recommended value for each investment goal, where the recommended value for each goal is not better than the ideal value and not worse than the acceptable value and wherein the recommendation has a measured confidence of exceeding the recommended value for each goal and wherein the measured confidence is within a predefined range;
the processor further configured for performing a second simulation of the recommended investment allocation over a second predetermined time period using the capital market modeling technique, the second simulation accounting for investments and expenditures planned to occur during the second predetermined time period; and
the processor further configured for, using the second simulation of the recommended investment allocation, determining (1) a plurality of upper boundary portfolio values, each upper boundary portfolio value corresponding to a date in the second predetermined time period, each upper boundary portfolio value comprising an amount of money calculated to provide a first predetermined likelihood of exceeding the recommended value for each goal from a present date until the corresponding date, (2) a plurality of lower boundary portfolio values, each lower boundary portfolio value corresponding to a date in the second predetermined time period, each lower boundary portfolio value comprising an amount of money calculated to provide a second predetermined likelihood of exceeding the recommended value for each goal from a present date until the corresponding date, (3) a plurality of anticipated future portfolio values, each anticipated future portfolio value corresponding to a date in the second predetermined time period, and (4) an estimated chance that the anticipated future portfolio values will be greater than the upper boundary portfolio value on a corresponding date or be less than the lower boundary portfolio value on a corresponding date.

23. The device of claim 22, wherein the ideal and acceptable values for each goal correspond to at least one of a dollar amount or a time for achieving the goal.

24. The device of claim 22, wherein the processor is further configured for communicating to the client the estimated chance obtained in the second simulation.

25. The device of claim 22, wherein the recommended investment allocation includes only passive investments.

26. The device of claim 22, wherein the capital market modeling technique comprises a reverse iteration algorithm.

27. The device of claim 26, wherein the processor is further configured for performing a first simulation of a plurality of model investment portfolio allocations using a reverse iteration algorithm by performing the steps of:
    obtaining a targeted portfolio end date and a targeted portfolio end value; and
    for each of a plurality of periodic dates over a time period extending from a present time to the targeted portfolio end date, determining an amount of money needed to have a targeted confidence of having the targeted portfolio end value at the targeted portfolio end date.

28. The device of claim 27, wherein the periodicity of the plurality of periodic dates is annually.

29. The device of claim 22, wherein the capital market modeling technique of the first simulation comprises a Monte Carlo analysis.

30. The device of claim 22, wherein the capital market modeling technique of the second simulation comprises a Monte Carlo analysis.

31. The device of claim 22, wherein the predetermined time period used in the second simulation is one year.

32. The device of claim 22, wherein the processor is further configured for determining an initial value of a client investment portfolio.

33. The device of claim 22, wherein the processor is further configured for obtaining a relative value comparison between pairs of investment goals within the list of goals, and wherein the processor is further configured for determining the recommendation using the relative value comparison among the goals and the simulation of the plurality of portfolio allocations.

34. The device of claim 33, wherein the processor is further configured for determining the recommendation using the relative value comparison between pairs of investment goals further by determining whether one or more low valued goals can be achieved with modifications to the values of other goals on the list.

35. The device of claim 33, wherein the processor is further configured for developing a matrix of the goals that represents the relative comparison between the pairs of investment goals, and wherein the processor is further configured for determining the recommendation using the goal matrix.

36. The device of claim 33, wherein the processor is further configured for:
    (a) periodically determining whether the client would like to add new goals or remove goals from the list of investment goals, or whether the client would like to make changes to the relative value comparison among the goals; and
    (b) re-performing the first performing and determining steps if the client has added or removed goals from the list of investment goals, or if the client has made changes to the relative value comparison.

37. The device of claim 33, wherein the relative value comparison is represented in terms of the price, in money or time, that the client is willing to pay in one goal within each pair of investment goals to achieve the other goal in the same pair of investment goals on the list.

38. The device of claim 22, wherein the ideal value of each goal is expressed either in terms of a soonest time for achieving the goal or a largest dollar value of the goal; and the acceptable value of each goal is a smaller dollar value or a later date for achieving that goal compared to the ideal value, and that is still acceptable to the client.

39. The device of claim 22, wherein the processor is further configured for obtaining a client targeted end date and targeted end investment portfolio value.

40. The device of claim 22, wherein the processor is further configured for determining the measured confidence of exceeding the recommended value for each goal by calculating a percentage of a plurality of different simulations in which the recommended value for each goal is exceeded.

41. The device of claim 40, wherein the processor is further configured for comparing the calculated percentage of the plurality of different simulations in which the recommended value for each goal is exceeded to a predetermined comfort zone to determine if the calculated percentage falls within the comfort zone.

42. The device of claim 22, wherein the processor is further configured for periodically monitoring the recommendation to determine whether, based on a current value of the client investment portfolio, the measured confidence is still within the predefined range; and
    wherein the processor is further configured for re-performing the first performing and determining steps if the measured confidence is not still within the predefined range.

43. A computer-readable storage medium having computer-readable executable instructions that, when executed by a computer, control the computer to implement a method of financial advising comprising:
    obtaining a list of a plurality of client investment goals from a client, and for each goal, identifying ideal and acceptable values, the ideal value of each goal being the value for that particular goal that the client most prefers to achieve, and the acceptable value of each goal being the value for that particular goal that is less preferable to the client compared to the ideal value but that is still acceptable to the client;
    performing a first simulation of a plurality of model investment portfolio allocations over a first predetermined time period using a capital market modeling technique, the first simulation accounting for investments and expenditures planned to occur during the first predetermined time period;
    using the first simulation and the ideal and acceptable values for each goal, determining a recommendation comprising an investment allocation and a recommended value for each investment goal, where the recommended value for each goal is not better than the ideal value and not worse than the acceptable value and wherein the recommendation has a measured confidence of exceeding the recommended value for each goal and wherein the measured confidence is within a predefined range;
    performing a second simulation of the recommended investment allocation over a second predetermined time period using the capital market modeling technique, the second simulation accounting for investments and expenditures planned to occur during the second predetermined time period; and
    using the second simulation of the recommended investment allocation, determining (1) a plurality of upper boundary portfolio values, each upper boundary portfolio value corresponding to a date in the second predetermined time period, each upper boundary portfolio value comprising an amount of money calculated to provide a first predetermined likelihood of exceeding the recommended value for each goal from a present date until the corresponding date, (2) a plurality of lower boundary portfolio values, each lower boundary portfolio value corresponding to a date in the second predetermined time period, each lower boundary portfolio value comprising an amount of money calculated to provide a second predetermined likelihood of exceeding the recommended value for each goal from a present date until the corresponding date, (3) a plurality of anticipated future portfolio values, each anticipated future portfolio value corresponding to a date in the second predetermined time period, and (4) an estimated chance that the anticipated future portfolio values will be greater than the upper boundary portfolio value on a corresponding date or be less than the lower boundary portfolio value on a corresponding date.

44. The computer-readable storage medium of claim 43, wherein the ideal and acceptable values for each goal correspond to at least one of a dollar amount or a time for achieving the goal.

45. The computer-readable storage medium of claim 43, wherein the method further comprises:
communicating to the client the estimated chance obtained in the second simulation.

46. The computer-readable storage medium of claim 43, wherein the recommended investment allocation includes only passive investments.

47. The computer-readable storage medium of claim 43, wherein the capital market modeling technique comprises a reverse iteration algorithm.

48. The computer-readable storage medium of claim 47, wherein performing a first simulation of a plurality of model investment portfolio allocations using a reverse iteration algorithm further comprises:
obtaining a targeted portfolio end date and a targeted portfolio end value; and
for each of a plurality of periodic dates over a time period extending from a present time to the targeted portfolio end date, determining an amount of money needed to have a targeted confidence of having the targeted portfolio end value at the targeted portfolio end date.

49. The computer-readable storage medium of claim 48, wherein the periodicity of the plurality of periodic dates is annually.

50. The computer-readable storage medium of claim 43, wherein the capital market modeling technique of the first simulation comprises a Monte Carlo analysis.

51. The computer-readable storage medium of claim 43, wherein the capital market modeling technique of the second simulation comprises a Monte Carlo analysis.

52. The computer-readable storage medium of claim 43, wherein the predetermined time period used in the second simulation is one year.

53. The computer-readable storage medium of claim 43, wherein the method further comprises:
determining an initial value of a client investment portfolio.

54. The computer-readable storage medium of claim 43, wherein the method further comprises:
obtaining a relative value comparison between pairs of investment goals within the list of goals;
wherein the step of determining the recommendation uses the relative value comparison among the goals and the simulation of the plurality of portfolio allocations.

55. The computer-readable storage medium of claim 54, wherein the step of determining the recommendation using the relative value comparison between pairs of investment goals further comprises determining whether one or more low valued goals can be achieved with modifications to the values of other goals on the list.

56. The computer-readable storage medium of claim 54, wherein the step of obtaining a relative value comparison among the goals further comprises developing a matrix of the goals that represents the relative comparison between the pairs of investment goals, and wherein the step of determining the recommendation uses the goal matrix.

57. The computer-readable storage medium of claim 54, wherein the method further comprises:
periodically determining whether the client would like to add new goals or remove goals from the list of investment goals, or whether the client would like to make changes to the relative value comparison among the goals; and
re-performing the first performing and determining steps if the client has added or removed goals from the list of investment goals, or if the client has made changes to the relative value comparison.

58. The computer-readable storage medium of claim 54, wherein the relative value comparison is represented in terms of the price, in money or time, that the client is willing to pay in one goal within each pair of investment goals to achieve the other goal in the same pair of investment goals on the list.

59. The computer-readable storage medium of claim 43, wherein the ideal value of each goal is expressed either in terms of a soonest time for achieving the goal or a largest dollar value of the goal; and the acceptable value of each goal is a smaller dollar value or a later date for achieving that goal compared to the ideal value, and that is still acceptable to the client.

60. The computer-readable storage medium of claim 43, wherein the method further comprises:
obtaining a client targeted end date and targeted end investment portfolio value.

61. The computer-readable storage medium of claim 43, wherein the measured confidence of exceeding the recommended value for each goal is determined by calculating a percentage of a plurality of different simulations in which the recommended value for each goal is exceeded.

62. The computer-readable storage medium of claim 61, wherein the method further comprises:
comparing the calculated percentage of the plurality of different simulations in which the recommended value for each goal is exceeded to a predetermined comfort zone; and
determining if the calculated percentage falls within the comfort zone.

63. The computer-readable storage medium of claim 43, wherein the method further comprises:
periodically monitoring the recommendation to determine whether, based on a current value of the client investment portfolio, the measured confidence is still within the predefined range; and
re-performing the first performing and determining steps if the measured confidence is not still within the predefined range.

* * * * *